(12) United States Patent
Mizumoto et al.

(10) Patent No.: US 9,595,259 B2
(45) Date of Patent: Mar. 14, 2017

(54) SOUND SOURCE-SEPARATING DEVICE AND SOUND SOURCE-SEPARATING METHOD

(71) Applicant: HONDA MOTOR CO., LTD., Tokyo (JP)

(72) Inventors: Takeshi Mizumoto, Wako (JP); Kazuhiro Nakadai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/833,615

(22) Filed: Aug. 24, 2015

(65) Prior Publication Data
US 2016/0064000 A1  Mar. 3, 2016

(30) Foreign Application Priority Data
Aug. 29, 2014  (JP) .................. 2014-176518

(51) Int. Cl.
*G10L 21/0272* (2013.01)
*G10L 17/02* (2013.01)
(Continued)

(52) U.S. Cl.
CPC .......... *G10L 17/02* (2013.01); *G06K 9/00261* (2013.01); *G06K 9/4647* (2013.01);
(Continued)

(58) Field of Classification Search
CPC . G01S 3/8083; G01S 5/22; G01S 5/20; G01S 3/808; G01S 3/8086; H04N 7/15;
(Continued)

(56) References Cited

U.S. PATENT DOCUMENTS

2002/0181721 A1* 12/2002 Sugiyama ................ G01H 3/00
                                                      381/92
2006/0002566 A1*  1/2006 Choi ........................ H04S 1/002
                                                      381/58
(Continued)

FOREIGN PATENT DOCUMENTS

| JP | 2007-274462 | 10/2007 |
|----|-------------|---------|
| JP | 2011-191423 | 9/2011  |
| JP | 2014-145838 | 8/2014  |

*Primary Examiner* — Marivelisse Santiago Cordero
*Assistant Examiner* — Stephen Brinich
(74) *Attorney, Agent, or Firm* — Rankin, Hill & Clark LLP

(57) ABSTRACT

A sound source-separating device includes a sound-collecting part, an imaging part, a sound signal-evaluating part, an image signal-evaluating part, a selection part that selects whether to estimate a sound source direction based on the first sound signal or the first image signal, a person position-estimating part that estimates a sound source direction using the first image signal, a sound source direction-estimating part that estimates a sound source direction, a sound source-separating part that extracts a second sound signal corresponding to the sound source direction from the first sound signal, an image-extracting part that extracts a second image signal of an area corresponding to the estimated sound source direction from the first image signal, and an image-combining part that changes a third image signal of an area other than the area for the second image signal and combines the third image signal with the second image signal.

9 Claims, 15 Drawing Sheets

(51) Int. Cl.
*G06T 7/00* (2006.01)
*G06K 9/46* (2006.01)
*G06K 9/00* (2006.01)
*H04R 1/40* (2006.01)
*G10L 15/26* (2006.01)
*G10L 21/0208* (2013.01)
*G10L 21/0216* (2013.01)
*G10L 21/028* (2013.01)

(52) U.S. Cl.
CPC ........ *G06T 7/0042* (2013.01); *G10L 21/0272* (2013.01); *H04R 1/406* (2013.01); *G06T 2207/30201* (2013.01); *G10L 15/26* (2013.01); *G10L 21/028* (2013.01); *G10L 21/0208* (2013.01); *G10L 2021/02166* (2013.01); *H04R 2430/23* (2013.01)

(58) Field of Classification Search
CPC .... H04N 7/142; H04N 21/2368; H04N 7/147; H04S 2400/00; H04S 2400/01; H04S 2400/11; H04S 2400/15; H04S 2420/01; H04S 7/30
USPC .......... 704/206, 231, 233; 348/14.08, 14.16; 381/310
See application file for complete search history.

(56) References Cited

U.S. PATENT DOCUMENTS

2006/0075422 A1* 4/2006 Choi ..................... G01S 3/7864
                                                725/18
2010/0098258 A1* 4/2010 Thorn .................. G06K 9/0057
                                                381/1

\* cited by examiner

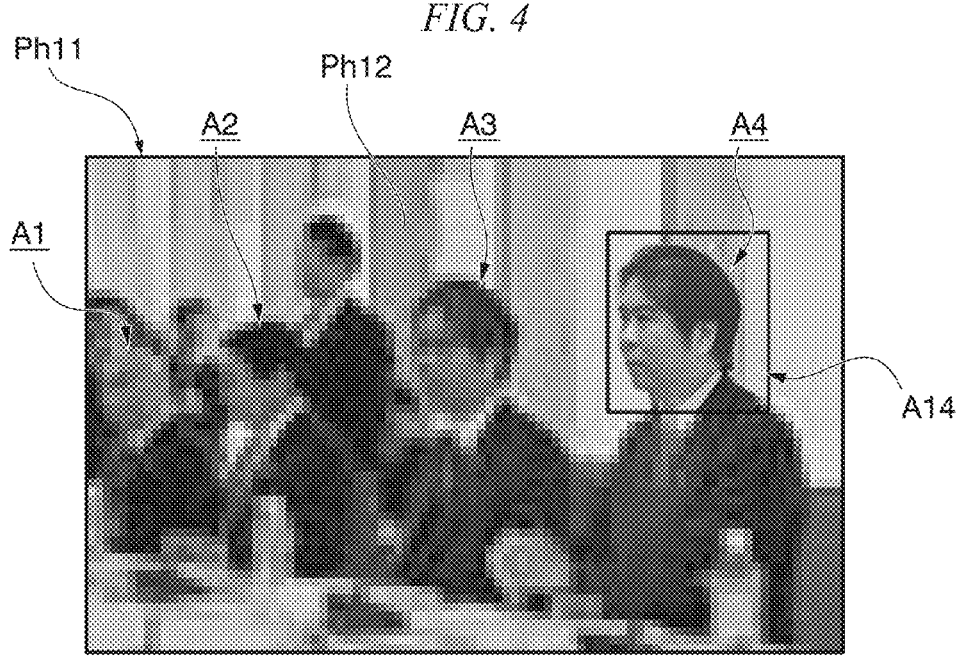

| EVALUATION RESULT OF IMAGE SIGNAL-EVALUATING PART | EVALUATION RESULT OF SOUND SIGNAL-EVALUATING PART | DETERMINATION RESULT |
|---|---|---|
| RELIABILITY IS HIGH | RELIABILITY IS HIGH | PRIORITY IS GIVEN TO SOUND SOURCE LOCALIZATION ESTIMATION RESULT |
| RELIABILITY IS HIGH | RELIABILITY IS LOW | PRIORITY IS GIVEN TO PERSON POSITION ESTIMATION RESULT |
| RELIABILITY IS LOW | RELIABILITY IS HIGH | PRIORITY IS GIVEN TO SOUND SOURCE LOCALIZATION ESTIMATION RESULT |
| RELIABILITY IS LOW | RELIABILITY IS LOW | PRIORITY IS GIVEN TO PERSON POSITION ESTIMATION RESULT |

FIG. 6

| UTTERANCE CONTENT | IMAGE IN WHICH RESOLUTION OF AREA OF SPEAKER IS NOT CHANGED |
|---|---|
| "THEN, LET'S START TODAY'S CONFERENCE. Mr. B, WHAT IS TODAY'S AGENDA?" | IMAGE OF SPEAKER Sp1 |
| "TODAY'S AGENDA IS CONSUMPTION TAX RATES OF EUROPEAN COUNTRIES." | IMAGE OF SPEAKER Sp2 |
| "Mr C, PLEASE REPORT PRESENT SITUATIONS OF CONSUMPTION TAX RATES IN EUROPE." | IMAGE OF SPEAKER Sp1 |
| "CONSUMPTION TAX IN JAPAN IS CONSTANT FOR FOOD AND JEWELLRY, BUT THE CONSUMPTION TAX RATES OF GENERAL GOODS AND CONSUMPTION TAX RATES OF FOODS ARE DIFFERENT IN MANY COUNTRIES. IN ENGLAND, CONSUMPTION TAX OF GENERAL GOODS IS 17.5% BUT THE CONSUMPTION TAX RATE OF FOODS IS 0%. IN FRANCE, CONSUMPTION TAX OF GENERAL GOODS IS 19.6% BUT CONSUMPTION TAX RATE OF FOODS IS 5.5%. IN GERMANY, CONSUMPTION TAX OF GENERAL GOODS IS 17% BUT CONSUMPTION TAX RATE OF FOODS IS 6%." | IMAGE OF SPEAKER Sp3 |
| "IS THE TAX RATE APPLIED TO HIGH-QUALITY GOODS SUCH AS CAVIAR AMONG FOODS?" | IMAGE OF SPEAKER Sp1 |
| "IT DEPENDS ON COUNTRIES. FOR EXAMPLE, IN FRANCE, CONSUMPTION TAX RATE OF CAVIAR IS 19.6% AND CONSUMPTION TAX RATE OF FOIE GRAS OR TRUFFLES IS 5.6%." | IMAGE OF SPEAKER Sp2 |
| ... | ... |

Ph2

Ph3

Ph21

Ph22

SOUND SOURCE-SEPARATING DEVICE AND SOUND SOURCE-SEPARATING METHOD

CROSS-REFERENCE TO RELATED APPLICATION

Priority is claimed on Japanese Patent Application No. 2014-176518, filed on Aug. 29, 2014, the contents of which are incorporated herein by reference.

BACKGROUND OF THE INVENTION

Field of the Invention

The present invention relates to a sound source-separating device and a sound source-separating method.

Description of Related Art

A device which collects the voice of participants in a conference and captures images of the participants has been proposed.

For example, in a video teleconference, a video teleconference device is installed in each place in which the conference is held, the video teleconference devices are connected to each other via a network, and the video teleconference devices transmit the collected sound signals and captured image signals with each other.

For example, Japanese Unexamined Patent Application, First Publication No. 2007-274462 proposes a video teleconference device including a microphone array, overall imaging means for capturing an overall image of a conference room, a plurality of specific participant imaging means for individually imaging participants and generating individual images correlated with the participants, speaker direction-detecting means for detecting a direction of a speaker based on a sound signal of the microphone array and generating speaker direction data, speaker voice signal-generating means for generating a speaker voice signal based on the detected direction of the speaker, and transmission means for transmitting the overall image, the individual images, the speaker voice signal, and the speaker direction data.

SUMMARY OF THE INVENTION

However, in the technique described in Japanese Unexamined Patent Application, First Publication No. 2007-274462, when a noise level of an environment in which sound is collected is high, the accuracy of sound source localization of a speaker is lowered. In the technique described in Japanese Unexamined Patent Application, First Publication No. 2007-274462, the individual image corresponding to the speaker direction data in which the sound source is localized is selected. Accordingly, when the accuracy of sound source localization is lowered, it may not be possible to correctly select the individual image.

The present invention is made in consideration of the above-mentioned circumstances and an object of the aspect of the present invention is to provide a sound source-separating device and a sound source-separating method which can enhance accuracy in estimating a sound source direction even in an environment having a high noise level.

The present invention employs the following aspects to achieve the above-mentioned object.

(1) According to an aspect of the present invention, there is provided a sound source-separating device including: a sound-collecting part configured to collect sound and generate a first sound signal; an imaging part configured to capture an image and generate a first image signal; a sound signal-evaluating part configured to evaluate the first sound signal; an image signal-evaluating part configured to evaluate the first image signal; a selection part configured to select whether to estimate a sound source direction based on the first sound signal or whether to estimate a sound source direction based on the first image signal, based on an evaluation result of the first sound signal by the sound signal-evaluating part and an evaluation result of the first image signal by the image signal-evaluating part; a person position-estimating part configured to estimate a sound source direction indicating a direction of a speaker by using the first image signal when the selection part has selected that the sound source direction is estimated based on the first image signal; a sound source direction-estimating part configured to estimate a sound source direction by using the first sound signal when the selection part has selected that the sound source direction is estimated based on the first sound signal; a sound source-separating part configured to extract a second sound signal corresponding to the sound source direction from the first sound signal based on the estimated sound source direction; an image-extracting part configured to extract a second image signal of an area corresponding to the estimated sound source direction from the first image signal; and an image-combining part configured to change a third image signal of an area other than the area for the second image signal and to combine the third image signal with the second image signal.

(2) In the aspect according to (1), the image-combining part may change a resolution of the third image signal to be lower than a resolution of the second image signal.

(3) In the aspect according to (1) or (2), the image signal-evaluating part may calculate a histogram of the first image signal, calculate a luminance range of luminance in which the number of pixels is equal to or greater than a predetermined value in the histogram, evaluate that reliability of the first image signal is high when the luminance range is equal to or greater than a predetermined range, and evaluate that the reliability of the first image signal is low when the luminance range is less than the predetermined range.

(4) In the aspect according to any one of (1) to (3), the image signal-evaluating part may calculate a histogram of the first image signal, count a luminance number in which the number of pixels is equal to or greater than a predetermined value, calculate a determination value by dividing total number of pixels of the first image signal by the counted value, and evaluate reliability of the first image signal based on the determination value.

(5) In the aspect according to any one of (1) to (4), the sound signal-evaluating part may calculate a magnitude of a noise component of the first sound signal based on a result of a noise-suppressing process which has been performed on the first sound signal and evaluate reliability of the first sound signal based on the calculated magnitude of the noise component.

(6) In the aspect according to any one of (1) to (5), the sound source-separating device may further include: an utterance section-detecting part configured to detect an utterance section based on at least one of the first sound signal and the first image signal; a sound-processing part configured to extract a third sound signal, which corresponds to the estimated sound source direction, from the first sound signal for each utterance section; and a correlation part configured to correlate the third sound signal with a fourth image signal of an area, which is extracted from the first image signal, including a face of a speaker for each utterance section.

(7) In the aspect according to (6), the sound source-separating device may further include a transmission part configured to transmit information in which the fourth image signal and the third sound signal are correlated with each other.

(8) In the aspect according to any one of (1) to (7), the sound-processing part may estimate a sound source direction by using the first sound signal or estimate a sound source direction based on information indicating the direction of a speaker which is estimated by the person position-estimating part and extract a fourth sound signal by separating the first sound signal for each sound source by using the sound source direction estimation result, and the sound-processing part may include: a feature value-calculating part configured to calculate a feature value of the fourth sound signal for each sound source separated by the sound-processing part; and a speech-recognizing part configured to recognize an utterance content based on the feature value of the fourth sound signal and convert the recognized utterance content into text information.

(9) According to another aspect of the present invention, there is provided a sound source-separating method including: collecting sound and generating a first sound signal; capturing an image and generating a first image signal; evaluating the first sound signal; evaluating the first image signal; selecting whether to estimate a sound source direction based on the first sound signal or whether to estimate a sound source direction based on the first image signal, based on an evaluation result of the first sound signal in the evaluating of the first sound signal and an evaluation result of the first image signal in the evaluating of the first image signal; estimating a sound source direction indicating a direction of a speaker by using the first image signal when it has been selected that a sound source direction is estimated based on the first image signal; and estimating a sound source direction by using the first sound signal when it has been selected that a sound source direction is estimated based on the first sound signal.

According to the configuration of any one of (1) to (9), it is possible to estimate a sound source direction based on at least one of the evaluation results of the captured image signal and the recorded sound signal. Therefore, according to this configuration, it is possible to estimate the sound source direction using the sound signal when the reliability of the image signal is low, and it is possible to estimate the sound source direction using the image signal when the reliability of the sound signal is low. According to this configuration, it is possible to separate the uttered sound signal based on the estimation result. Therefore, according to this configuration, it is possible to mutually complement the sound signal and the image signal in order to perform the separation of the sound source.

According to the configuration of above mentioned (1), an image of an area other than an image in a sound source direction is changed and the image in the sound source direction and the changed image are combined. Accordingly, it is possible to reduce the amount of image information.

According to the configuration of above mentioned (2), the resolution of the image of the area other than the image in the sound source direction is changed to be lower than the resolution of the image in the sound source direction, and the image in the sound source direction and the changed image are combined. Accordingly, it is possible to reduce the amount of image information.

According to the configuration of above mentioned (3), the reliability of the image signal is evaluated based on the width of the luminance area in which the number of pixels is equal to or greater than a predetermined number in the histogram of the image signal. Accordingly, it is possible to quantitatively and simply evaluate the image signal.

According to the configuration of above mentioned (4), the luminance number in which the number of pixels are equal to or greater than a predetermined number in the histogram of the image signal is counted and the reliability of the image signal is evaluated based on the determination value obtained by dividing the total number of pixels of the image by the counted value. Accordingly, it is possible to quantitatively and simply evaluate the image signal.

According to the configuration of above mentioned (5), the reliability of the sound signal is evaluated based on the magnitude of the noise component of the sound signal which is calculated based on the result of the reverberation suppressing process. Accordingly, it is possible to quantitatively and simply evaluate the sound signal.

According to the configuration of above mentioned (6), it is possible to extract an utterance section from the image signal or the sound signal based on the sound source direction estimation result using at least one of the image signal and the sound signal. Accordingly, even when the reliability of one of the image signal and the sound signal is low, it is possible to detect an utterance section with high accuracy. As a result, according to this configuration, it is possible to accurately separate the uttered speech signal for each utterance section.

According to the configuration of above mentioned (7), the sound signal separated based on the sound source direction estimation result of at least one of the image signal and the sound signal and an image including an extracted face of a speaker can be correlated with each other for each utterance section and can be transmitted to another device. As a result, when the sound source-separating device having this configuration is used for a video teleconference and the reliability of one of the image signal and the sound signal is low, the separated sound signal and the image including an extracted face of a speaker can be correlated with each other and can be transmitted to another device.

According to the configuration of above mentioned (8), speech recognition can be performed on the sound signal separated based on the sound source direction estimation result of at least one of the image signal and the sound signal and the recognized speech can be converted into text. As a result, even when the reliability of one of the image signal and the sound signal is low, it is possible to enhance accuracy of a text recognition rate in the minutes.

BRIEF DESCRIPTION OF THE DRAWINGS

FIG. 4 is a diagram illustrating a histogram of the images illustrated in FIGS. 2 and 3.

FIG. 5 is a diagram illustrating an example of a determination result of a reliability-determining part according to the first embodiment.

FIG. 6 is a diagram illustrating an example of minutes information correlated by a correlation part.

DESCRIPTION OF EMBODIMENTS

An overview of the present invention will be first described below.

A sound source-separating device 1 according to an embodiment is installed, for example, in a conference room. The sound source-separating device 1 includes a sound-collecting part and an imaging part and acquires a sound signal and an image signal of a speaker in a conference. The sound source-separating device 1 evaluates the acquired sound signal and evaluates the acquired image signal. Here, the evaluation target of the sound signal is, for example, a noise level and a signal-to-noise ratio (S/N ratio) of the sound signal corresponding to an utterance of the speaker. The evaluation target of the image signal is luminance and contrast in an image and the like. The sound source-separating device 1 determines whether to localize a sound source based on the sound signal or whether to estimate a position of a speaker based on the image signal depending on the evaluation result. The sound source-separating device 1 does not lower the resolution of a section in which a speaker utters and does not lower the resolution of an area including the face of the uttering speaker, but lowers the resolution of other areas. The sound source-separating device 1 extracts only the uttered speech from the sound signal.

Hereinafter, embodiments of the present invention will be described with reference to the accompanying drawings.

First Embodiment

Figure 1:
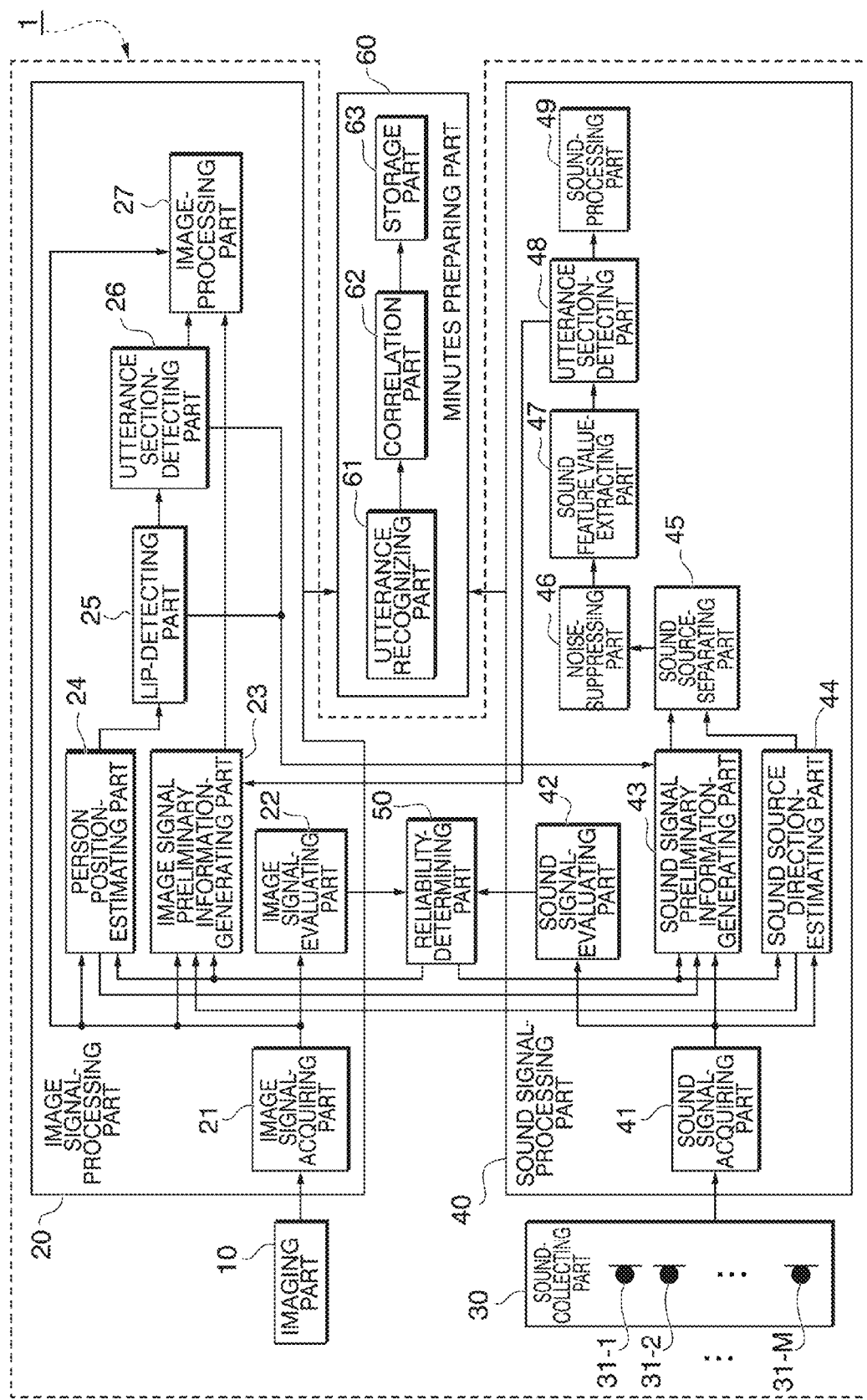
FIG. 1 is a block diagram illustrating a configuration of a sound source-separating device according to a first embodiment.

FIG. 1 is a block diagram illustrating a configuration of a sound source-separating device 1 according to a first embodiment of the present invention. As illustrated in FIG. 1, the sound source-separating device 1 includes an imaging part 10, an image signal-processing part 20, a sound-collecting part 30, a sound signal-processing part 40, and a reliability-determining part 50 (selection part). The sound source-separating device 1 is connected to a minutes preparing part 60. The sound source-separating device 1 may include the minutes preparing part 60.

The imaging part 10 captures an image at predetermined intervals and transmits an image signal generated by capturing an image to the image signal-processing part 20. The imaging part 10 may transmit the generated image signal in a wireless manner or a wired manner. When the number of imaging parts 10 is two or more, image signals only need to be synchronized with each other for each channel at the time of transmission. The image may be a still image or a moving image. The imaging part 10 may be installed at a position at which an overall conference room can be imaged. Alternatively, when a plurality of participants in the conference are seated, for example, behind tables arranged in parallel, a plurality of imaging parts 10 may be installed at positions at which at least a mouth of a participant seated behind each table can be imaged.

Figure 2:
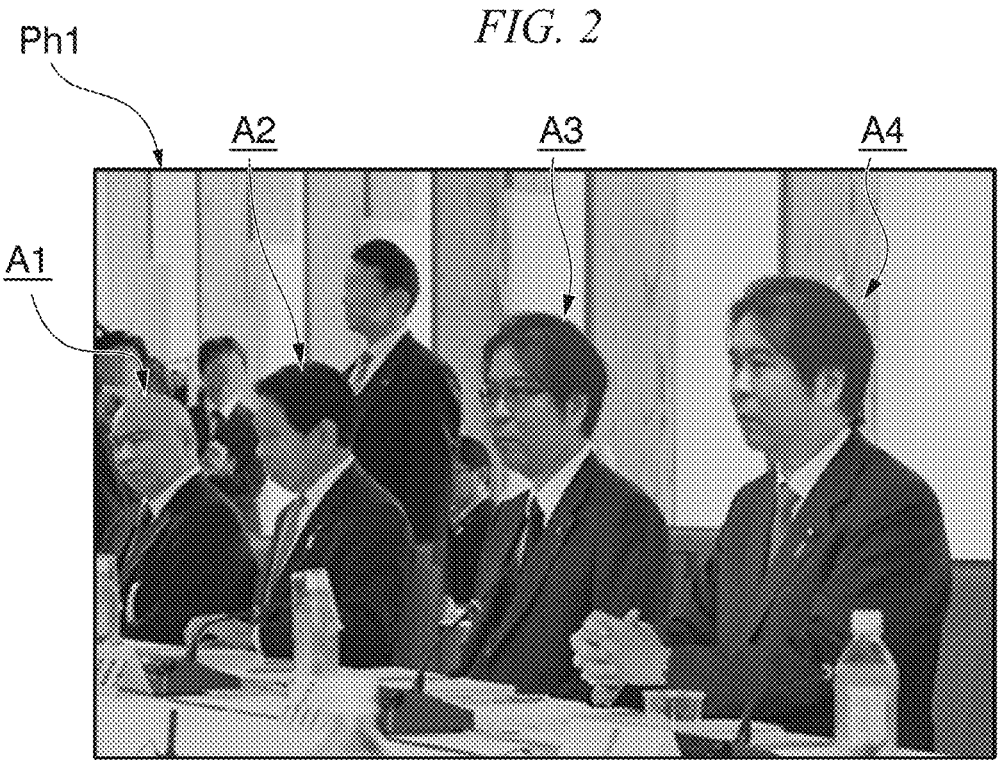
FIG. 2 is a diagram illustrating an example of an image captured by an imaging part.

FIG. 2 is a diagram illustrating an example of an image captured by the imaging part 10. As illustrated in FIG. 2, the entire part of an image Ph1 has a sufficient luminance component. Accordingly, as will be described below, the number of speakers, positions of the speakers, and whether a speaker utters a sound can be estimated by performing an image recognition at the image Ph1. In FIG. 2, images of areas indicated by reference marks A1 to A4 are images corresponding to speakers Sp1 to Sp4. Hereinafter, speakers Sp1 to Sp4 are simply referred to as a speaker Sp unless the speaker is specified.

Referring to FIG. 1 again, the description of the configuration of the sound source-separating device 1 will be continued below.

The image signal-processing part 20 includes an image signal-acquiring part 21, an image signal-evaluating part 22, an image signal preliminary information-generating part 23, a person position-estimating part 24, a lip-detecting part 25 (person position-estimating part), an utterance section-detecting part 26 (person position-estimating part), and an image-processing part 27 (image-extracting part and image-combining part).

The image signal-acquiring part 21 acquires the image signal transmitted from the imaging part 10 and converts the acquired image signal from an analog signal into a digital signal. The image signal-acquiring part 21 outputs the converted image signal as the digital signal to the image signal-evaluating part 22, the image signal preliminary information-generating part 23, the person position-estimating part 24, and the image-processing part 27.

The image signal-evaluating part 22 evaluates the image signal input from the image signal-acquiring part 21. For example, the image signal-evaluating part 22 evaluates the image signal by calculating a histogram of the input image signal and determining whether the luminance of the image signal is equal to or greater than a predetermined value based on the calculated histogram. The image signal-evaluating part 22 outputs the evaluation result to the reliability-determining part 50. The evaluation method which is performed by the image signal-evaluating part 22 will be described below.

The image signal from the image signal-acquiring part 21 and the determination result from the reliability-determining part 50 are input to the image signal preliminary information-generating part 23. The sound source direction estimation result from a sound source direction-estimating part 44 of the sound signal-processing part 40 and information indicating an utterance section from an utterance section-detecting part 48 are input to the image signal preliminary information-generating part 23. The image signal preliminary information-generating part 23 determines whether to generate preliminary information of the image signal based on the determination result of the reliability-determining part 50. Here, the preliminary information of an image signal is information indicating a position of an uttering speaker. It is assumed that the information input from the sound source direction-estimating part 44 is based on coordinates in a world coordinate system. Accordingly, the image signal preliminary information-generating part 23 transforms the coordinates of an image based on the image signal to coordinates in the world coordinate system using a well-known coordinate transformation technique. When the reliability-determining part 50 determines that priority is given to the person position estimation result, the image signal preliminary information-generating part 23 does not perform an image signal preliminary information generating process and does not output the preliminary information to the image-processing part 27. On the other hand, when the reliability-determining part 50 determines that priority is given to the sound source localization estimation result, the image signal preliminary information-generating part 23 performs the image signal preliminary information generating process for each utterance section using the sound source direction estimation result and outputs information, which is the generated preliminary information of the image signal, indicating an area of a face of a speaker to the image-processing part 27.

The image signal from the image signal-acquiring part 21 and the determination result from the reliability-determining part 50 are input to the person position-estimating part 24. The person position-estimating part 24 determines whether to estimate a position of a person (hereinafter, also referred to as person position estimation) using the input image signal based on the determination result from the reliability-determining part 50. When the determination result of the reliability-determining part 50 indicates that priority is given to the person position estimation result, the person position-estimating part 24 recognizes positions of persons appearing in the image and images of faces thereof based on the input image signal using a well-known image recognition technique. A position of a person is, for example, a position of an area including a face. The person position-estimating part 24 transforms the coordinates of information indicating the position of a person from the coordinate system in the image to the world coordinate system using a well-known technique. The person position-estimating part 24 sets information (person position information) indicating the recognized area as an estimation result and outputs the estimation result and the image information (hereinafter, referred to as face image information) including an area of a face to the lip-detecting part 25.

The person position-estimating part 24 detects, for example, parts of a face (such as an outline of a face, hair, eyebrows, eyes, a nose, a mouth) from the image, determines whether the image is suitable for a human face by comparing the positional relationships of the parts with a face-recognizing database which is stored in advance in the person position-estimating part 24, and recognizes the face when it is determined that the image is suitable for a human face. The person position-estimating part 24 extracts face image information by extracting an image of an area including the recognized face from the image signal of the entire image. The face image information includes the image including the area of the face and information indicating the area of the face image in the entire image.

On the other hand, when the reliability-determining part 50 determines that priority is given to the sound source localization estimation result, the person position-estimating part 24 does not estimate the position of a person and does not output the estimation result to the lip-detecting part 25.

The person position-estimating part 24 outputs the information indicating the estimated position of the area including the face of each person, which is expressed in the world coordinate system, to a sound signal preliminary information-generating part 43 of the sound signal-processing part 40.

Figure 3:
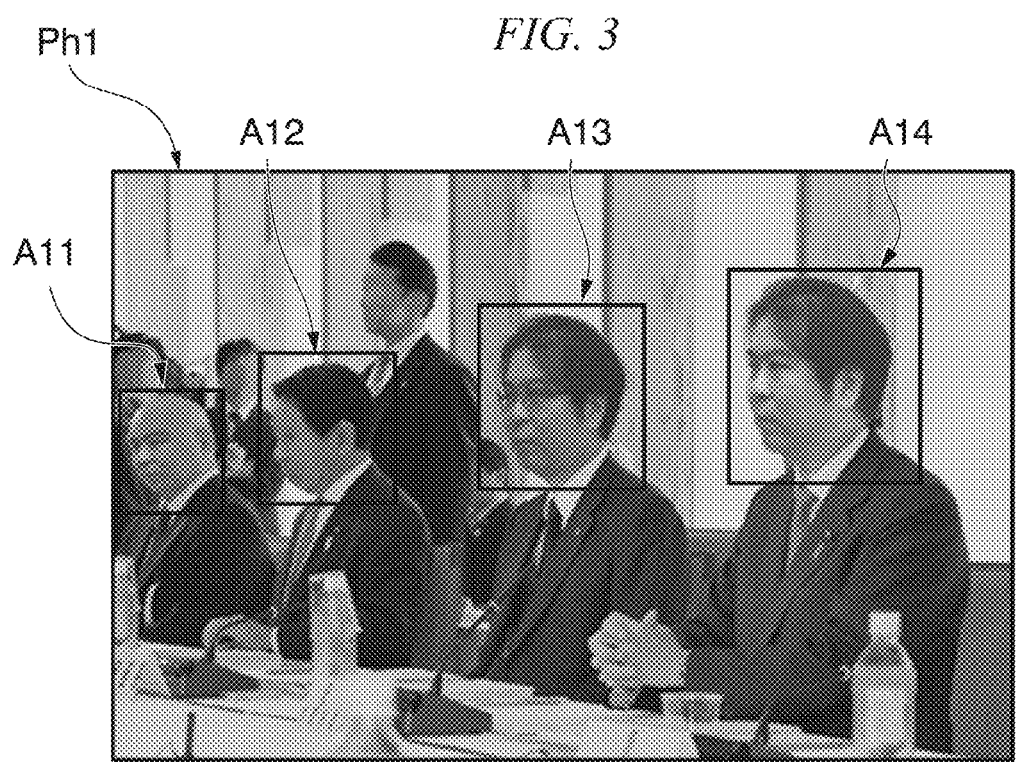
FIG. 3 is a diagram illustrating an example of a face recognition result in the image illustrated in FIG. 2.

FIG. 3 is a diagram illustrating an example of a face recognition result in the image Ph1 illustrated in FIG. 2. In the example illustrated in FIG. 3, images of areas denoted by reference marks A11 to A14 are face images corresponding to the speakers Sp1 to Sp4. The area of a face image only has to include at least the outline of the face, and may be, for example, an upper body or an image of the entire area corresponding to a speaker Sp.

Referring to FIG. 1 again, the description of the configuration of the sound source-separating device 1 will be continued below.

The lip-detecting part 25 estimates an uttering speaker by detecting the shapes of lips of the speakers based on the face image information input from the person position-estimating part 24 using a well-known technique (for example, see Japanese Unexamined Patent Application, First Publication No. 2011-191423). The lip-detecting part 25 selects the face image information of the uttering speaker depending on the detection result. The lip-detecting part 25 outputs the selected face image information of the uttering speaker to the utterance section-detecting part 26. The lip-detecting part 25 outputs position information of the area including the face of the speaker included in the selected face image information of the uttering speaker to the sound signal preliminary information-generating part 43.

The utterance section-detecting part 26 detects an utterance section based on the detection result input from the lip-detecting part 25 using a well-known technique (for example, see Japanese Unexamined Patent Application, First Publication No. 2011-191423). The utterance section-detecting part 26 outputs information indicating the detected utterance section and the face image information of the speaker to the image-processing part 27. The utterance section-detecting part 26 outputs the information indicating the detected utterance section to the sound signal preliminary information-generating part 43.

In this embodiment, the lip-detecting part 25 and the utterance section-detecting part 26 are included in the image signal-processing part 20, but these functional parts may be included in the person position-estimating part 24. In this case, the person position-estimating part 24 may output the information indicating an utterance section, the information indicating a position of an area including a face of each person, and the information indicating a position of an area including a face of an uttering person to the sound signal preliminary information-generating part 43.

The image signal from the image signal-acquiring part 21 and the information indicating the utterance section and the face image information of a speaker from the utterance section-detecting part 26 are input to the image-processing part 27 (image-extracting part, image-combining part). Alternatively, the information indicating the area of the face of the speaker as the preliminary information of the image signal from the image signal preliminary information-generating part 23 is input to the image-processing part 27. The image-processing part 27 sets the resolution of an image of the non-uttering persons and other areas to be lower than the resolution of the input image for each utterance section using the input information.

For example, when the captured image is 300 [bpi(bits/inch), the image-processing part 27 maintains the resolution of the extracted image at 300 [bpi] and lowers the resolution of the image of the non-uttering persons and other areas to, for example, 30 [bpi] which is one tenth thereof. The image-processing part 27 combines the face image of the speaker of which the resolution is not changed with the image of the non-uttering persons and other areas of which the resolution is lowered for each utterance section.

The image-processing part 27 may lower the resolution of the entire image during a silent section in which sounds are not uttered.

FIG. 4 is a diagram illustrating an example of an image Ph11 subjected to image processing while the speaker Sp4 is speaking in this embodiment. In FIG. 4, an image of the area indicated by reference mark Ph12 is an image of non-uttering persons and other areas. An image in the area indicated by reference mark A14 is an image which is extracted as a face image of the speaker Sp4. As illustrated in FIG. 4, even when the resolution of the image of the non-uttering persons and other areas is set to be lower than the resolution of the original image, the profiles of the participants in the conference remain and thus a person watching the image can confirm the number of participants in the conference and the uttering speaker Sp4. In this way, by lowering the resolution of the image of the non-uttering persons and other areas, it is possible to reduce the amount of image data. Here, the resolution of the entire captured image is not lowered as the resolution of the face image of the speaker Sp4 is maintained. Accordingly, when the image information illustrated in FIG. 4 is recorded or is transmitted to another device, an observer can confirm the speaker and a situation in which the speaker is speaking The image illustrated in FIG. 4 may be a part of a moving image. In this case, the image-processing part 27 can achieve the same advantages by maintaining the resolution of the area including the face of the speaker and lowering the resolution of the image of the non-uttering persons and other areas.

Referring to FIG. 1 again, the description of the configuration of the sound source-separating device 1 will be continued below.

The sound-collecting part 30 collects sound and generates sound signals of M channels (where M is an integer greater than 1 and is, for example, eight) and transmits the generated sound signals of M channels to the sound signal-processing part 40. The sound-collecting part 30 includes, for example, M microphones 31-1 to 31-M which receive sound waves having components in a frequency band (for example, 200 Hz to 4 kHz). Hereinafter, one of the microphones 31-1 to 31-M is simply referred to as a microphone 31 unless specified. The M microphones 31 are arranged at different positions. The sound-collecting part 30 may transmit the generated sound signals of M channels in a wireless manner or a wired manner. When M is greater than one, the sound signals only need to be synchronized with each other for each channel at the time of transmission.

The sound signal-processing part 40 includes a sound signal-acquiring part 41, a sound signal-evaluating part 42, the sound signal preliminary information-generating part 43, the sound source direction-estimating part 44, a sound source-separating part 45, a noise-suppressing part 46, a sound feature value-extracting part 47, the utterance section-detecting part 48, and a sound-processing part 49 (sound source-separating part).

The sound signal-acquiring part 41 receives a sound signal transmitted from the sound-collecting part 30 for each channel.

The sound signal-acquiring part 41 converts the acquired sound signals from analog signals to digital signals and outputs the converted sound signals to the sound signal-evaluating part 42, the sound signal preliminary information-generating part 43, and the sound source direction-estimating part 44.

The sound signal-evaluating part 42 evaluates the sound signals input from the sound signal-acquiring part 41. For example, the sound signal-evaluating part 42 evaluates whether the magnitude of a noise component included in the sound signal is equal to or greater than a predetermined magnitude by checking the amplitude of the sound signals, analyzing the frequency components of the sound signals, and the like. The sound signal-evaluating part 42 outputs the evaluation result to the reliability-determining part 50. The evaluation method which is performed by the sound signal-evaluating part 42 will be described below.

The sound signals from the sound signal-acquiring part 41 and the determination result from the reliability-determining part 50 are input to the sound signal preliminary information-generating part 43. The information indicating the positions of the areas including faces of the persons from the person position-estimating part 24, the information indicating the position of the area including a face of an uttering person from the lip-detecting part 25, and the information indicating an utterance section from the utterance section-detecting part 26 are input to the sound signal preliminary information-generating part 43. The sound signal preliminary information-generating part 43 determines whether to generate preliminary information of sound signals based on the determination result of the reliability-determining part 50. Here, the preliminary information of sound signals is information indicating the direction of the uttering speaker (sound source direction).

When the reliability-determining part 50 determines that priority is given to the person position estimation result, the sound signal preliminary information-generating part 43 does not perform a preliminary information generating process and does not output the preliminary information of sound signals to the sound source-separating part 45. On the other hand, when the reliability-determining part 50 determines that priority is given to the sound source localization estimation result, the sound signal preliminary information-generating part 43 generates the preliminary information of sound signals using the information indicating the position of the area including the face of the uttering speaker for each utterance section and outputs the information indicating the direction of the speaker which is the generated preliminary information to the sound source-separating part 45. The estimated direction of the speaker is an azimuth which is expressed in the world coordinate system.

The sound signals from the sound signal-acquiring part 41 and the determination result from the reliability-determining part 50 are input to the sound source direction-estimating part 44. The sound source direction-estimating part 44 determines whether to perform sound source direction estimation (hereinafter, also referred to as sound source localization) of a person using the input sound signals based on the determination result of the reliability-determining part 50. When the reliability-determining part 50 determines that the reliability of the sound signals is higher than the reliability of the image signal, the sound source direction-estimating part 44 estimates a direction of each sound source based on the input sound signals, for example, using a multiple signal classification (MUSIC) method or a beam forming method and outputs the estimation result and the sound signals to the sound source-separating part 45.

The sound source-separating part 45 separates a sound source based on the estimation result and the sound signals input from the sound source direction-estimating part 44 or based on the preliminary information of sound signals and the sound signals input from the sound signal preliminary information-generating part 43 using a well-known technique such as a blind signal separation technique, a blind sound source separation technique based on independent component analysis, or a blind signal separation technique using sparsity of a signal. If a signal is sparse, it denotes that a signal level is 0 most of the time and in most frequencies. The sound source-separating part 45 outputs the separation result and the sound signals to the noise-suppressing part 46.

The noise-suppressing part 46 suppresses noise components included in the sound signals based on the separation result input from the sound source-separating part 45 using a well-known technique such as a histogram-based recursive level estimation (HRLE) technique, a technique based on a process of inversely filtering a room impulse response, a technique based on power spectrum estimation of a sound source, a technique based on a modulation transfer function (MTF) theory, and a technique based on geometric sound separation (GSS). The noise-suppressing part 46 inputs a speech signal, which is a reverberation-suppressed sound signal for each sound source, to the sound feature value-extracting part 47.

The sound feature value-extracting part 47 extracts, for example, a mel-scale logarithmic spectrum (MSLS) which is a sound feature value from the reverberation-suppressed speech signal for each sound source input from the noise-suppressing part 46. The MSLS is a feature value for sound recognition and can be obtained by performing inverse discrete cosine transform on a mel frequency cepstrum coefficient (MFCC) using the spectrum feature value thereof. The sound feature value-extracting part 47 outputs the input speech signal and the extracted sound feature value to the utterance section-detecting part 48 for each sound source. Only the MFCC may be used as the sound feature value.

The utterance section-detecting part 48 calculates a logarithmic likelihood of non-utterance between utterances, that is, of a silent section based on the sound feature value input from the sound feature value-extracting part 47 and determines that the section is a silent section when the calculated logarithmic likelihood of non-utterance is equal to or greater than a predetermined value. An existing method such as a database utterance section detecting method is used to calculate the logarithmic likelihood of non-utterance. The utterance section-detecting part 48 may use a logarithmic likelihood of non-utterance which is an intermediate result of utterance section detection (A-VAD (Audio VAD (Voice Activity Detection))) in the sound signals (for example, see Japanese Unexamined Patent Application, First Publication No. 2011-191423). The utterance section-detecting part 48 determines that sections other than the silent section is an utterance section and outputs the information indicating the determined utterance section and the sound feature value for each utterance section to the sound-processing part 49, the image signal preliminary information-generating part 23, and the minutes preparing part 60.

The sound-processing part 49 extracts the sound signal (subjected to the sound source-separating process and the noise-suppressing process) generated during the utterance section and the sound feature value corresponding to the speech for each utterance section.

The evaluation result from the image signal-evaluating part 22 and the evaluation result from the sound signal-evaluating part 42 are input to the reliability-determining part 50. The reliability-determining part 50 determines whether to give priority to the sound source localization estimation result or whether to give priority to the person position estimation result by determining the evaluation result from the image signal-evaluating part 22 and the evaluation result from the sound signal-evaluating part 42 using a predetermined correspondence table illustrated in FIG. 5.

FIG. 5 is a diagram illustrating an example of the determination result of the reliability-determining part 50 according to this embodiment. As illustrated in FIG. 5, the reliability-determining part 50 gives priority to the sound source localization estimation result when the evaluation result of the image signal-evaluating part 22 indicates that "the reliability is high" and the evaluation result of the sound signal-evaluating part 42 indicates that "the reliability is high." In this case, priority may be given to the person position estimation result. The reliability-determining part 50 gives priority to the sound source localization estimation result when the evaluation result of the image signal-evaluating part 22 indicates that "the reliability is low" and the evaluation result of the sound signal-evaluating part 42 indicates that "the reliability is high."

The reliability-determining part 50 gives priority to the person position estimation result when the evaluation result of the image signal-evaluating part 22 indicates that "the reliability is high" and the evaluation result of the sound signal-evaluating part 42 indicates that "the reliability is low," or when the evaluation result of the image signal-evaluating part 22 indicates that "the reliability is low" and the evaluation result of the sound signal-evaluating part 42 indicates that "the reliability is low." The reason for giving priority to the person position estimation result when the evaluation result of the image signal-evaluating part 22 indicates that "the reliability is low" and the evaluation result of the sound signal-evaluating part 42 indicates that "the reliability is low" is that a profile of a person may be estimated even when an image is excessively dark or bright or the contrast thereof is excessively high or low as in the examples illustrated in FIGS. 7, 8, 10, and 11 to be described below.

The example illustrated in FIG. 5 is an example, and to which estimation result is given priority may be determined by experiments as the determination result based on the evaluation result of the image signal-evaluating part 22 and the evaluation result of the sound signal-evaluating part 42.

The determination result input to the reliability-determining part 50 may be evaluation values calculated by the image signal-evaluating part 22 and the sound signal-evaluating part 42 as will be described below. The reliability-determining part 50 may determine to which estimation result is to be given priority based on the input evaluation values. In this case, to which estimation result is to be given priority based on the evaluation values may be stored in the form of a determinable table as illustrated in FIG. 5 in advance. In this case, the reliability-determining part 50 may perform the determination by normalizing the evaluation values calculated by the image signal-evaluating part 22 and the sound signal-evaluating part 42 and comparing both values.

Referring to FIG. 1 again, the description of the configuration of the sound source-separating device 1 will be continued below.

The minutes preparing part 60 includes an utterance recognizing part 61, a correlation part 62, and a storage part 63.

The detected utterance section information and the sound feature value corresponding to the sound signal during the utterance section are input to the utterance recognizing part 61 from the sound signal-processing part 40. The utterance recognizing part 61 recognizes an utterance using the input utterance section information and the MSLS information of the input sound feature value.

The recognition of an utterance is performed, for example, using a multi-band Julius (Y. Nishimura, et al., "Speech recognition for a humanoid with motor noise utilizing missing feature theory," Humanoids 2006, pp. 26-33) which can designate a stream weight as a general large vocabulary continuous speech recognition engine. The utterance recognizing part 61 may perform utterance recognition by performing well-known syntax analysis, dependency analysis, and the like. The recognition result is text information. The utterance recognizing part 61 outputs the recognition result to the correlation part 62.

The recognition result from the utterance recognizing part 61 and the image information processed by the image-processing part 27 are input to the correlation part 62. The correlation part 62 correlates utterance content with an image during an utterance to generate minutes information as illustrated in FIG. 6. The correlation part 62 stores the generated minutes information in the storage part 63. Here, the image under utterance is an image obtained by combining the image in which the resolution of the area of a speaker is not changed with an image obtained by lowering the resolution of the image of non-uttering persons and other areas as in the example illustrated in FIG. 4. The correlation part 62 may additionally store information indicating the speaker and the speech signal of the speaker in an utterance section in the storage part 63 in correlation with each other. In this case, the information indicating the speaker during the utterance section and the speech signal of the speaker are also input from the sound signal-processing part 40.

FIG. 6 is a diagram illustrating an example of the minutes information which is correlated by the correlation part 62.

In the example illustrated in FIG. 6, "Then, let's start today's conference. Mr. B, what is today's agenda?" as utterance content is correlated with an image obtained by not changing the resolution of the area of the speaker Sp1 and lowering the resolution of other persons or other areas as the image during an utterance. A reader of the minutes can see the number of participants in the conference and the speaker in the conference from the image based on the minutes information.

The utterance content and the images during utterances illustrated in FIG. 6 are correlated and stored in the storage part 63. When the correlation part 62 correlates speaker identification information with speech information of the utterance section as the minutes information, this information may be correlated and stored.

As described above, in this embodiment, when the image signal has reliability higher than that of the sound signal, the person position-estimating part 24 estimates the positions of persons appearing in the image based on the input image signal using a well-known technique. The sound signal-processing part 40 generates the preliminary information of sound signals using the estimated result and performs a sound source localizing process using the generated preliminary information of sound signals.

On the other hand, when the determination result of the reliability-determining part 50 indicates that the sound signal has reliability higher than that of the image signal, the sound source direction-estimating part 44 performs a sound source localization estimating process on the input sound signals using a well-known technique. The image signal-processing part 20 generates preliminary information of an image signal using the estimation result and performs a person position estimating process using the generated preliminary information of an image signal.

That is, the sound source-separating device 1 according to this embodiment detects a position of a speaker and localizes a sound source by mutually complementing the image signal and the sound signal using the information thereof.

Evaluation of Image Signal

A process flow which is performed by the image signal-evaluating part 22 will be described below.

Figure 7:
FIG. 7 is a diagram illustrating an excessively-dark image.
Figure 8:
FIG. 8 is a diagram illustrating an excessively-bright image.

FIG. 7 is a diagram illustrating an example of an excessively-dark image Ph2. FIG. 8 is a diagram illustrating an example of an excessively-bright image Ph3.

Figure 9A:
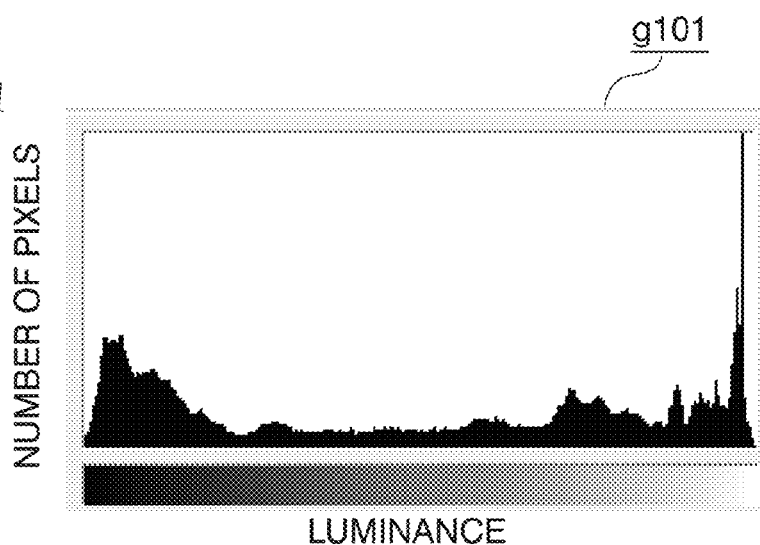
FIG. 9A is a diagram illustrating a histogram of the image illustrated in FIG. 2.
Figure 9B:
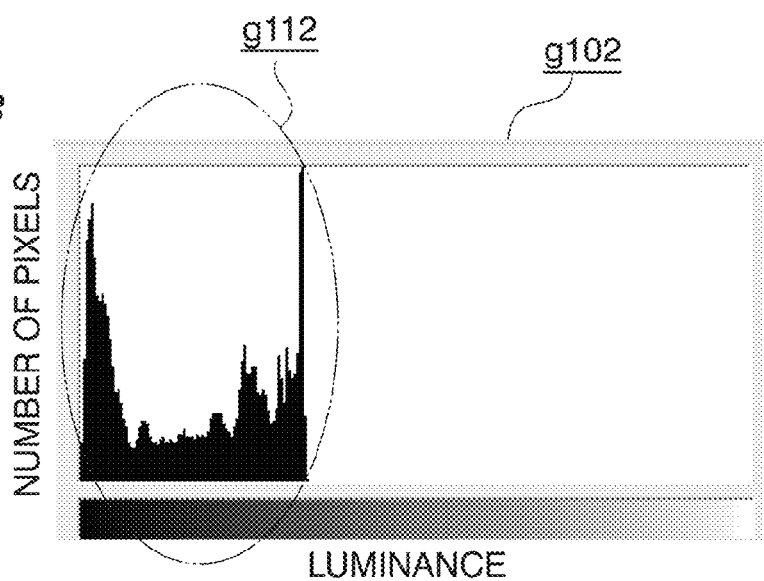
FIG. 9B is a diagram illustrating a histogram of the image illustrated in FIG. 7.
Figure 9C:
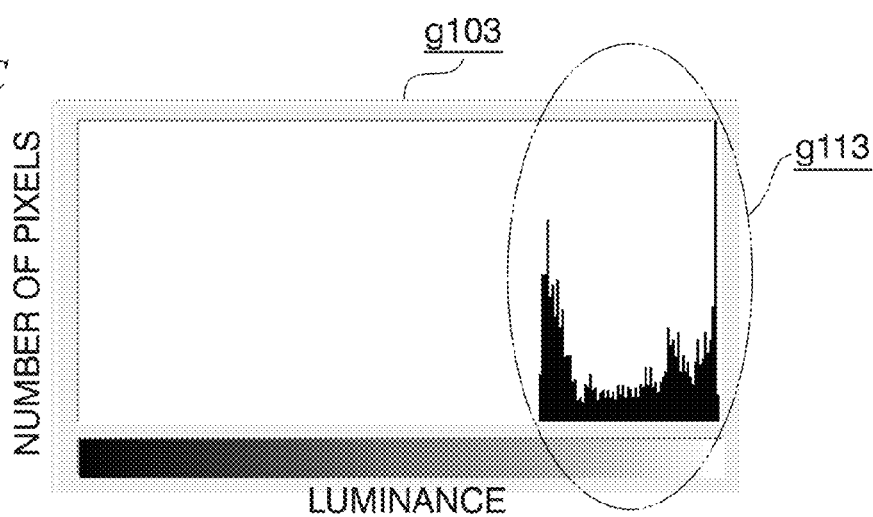
FIG. 9C is a diagram illustrating a histogram of the image illustrated in FIG. 8.

The image in the example illustrated in FIG. 7 is excessively dark as a whole and the image in the example illustrated in FIG. 8 is excessively bright as a whole. Accordingly, when the image Ph2 and the image Ph3 are looked at, it may not be possible to accurately estimate the number of speakers, the positions of the speakers, and whether the speakers are speaking FIG. 9A is a diagram illustrating a histogram of the image illustrated in FIG. 2. FIG. 9B is a diagram illustrating a histogram of the image illustrated in FIG. 7. FIG. 9C is a diagram illustrating a histogram of the image illustrated in FIG. 8. In FIGS. 9A to 9C, the horizontal axis represents luminance and the vertical axis represents the number of pixels. The luminance has a minimum value on the leftmost side and has a maximum value on the rightmost side. An image indicated by reference mark g101 in FIG. 9A is a diagram of the histogram of the image Ph1 illustrated in FIG. 2. In the image indicated by reference mark g101, the components of the image signal of the image Ph1 are distributed in a range from the minimum luminance value to the maximum luminance value.

An image indicated by reference mark g102 in FIG. 9B is a diagram of the histogram of the image Ph2 illustrated in FIG. 7. In the image of the area indicated by reference mark g112, the components of the image signal of the image Ph2 are distributed in a range from the minimum luminance value to an intermediate luminance value.

An image indicated by reference mark g103 in FIG. 9C is a diagram of the histogram of the image Ph3 illustrated in FIG. 8. In the image of the area indicated by reference mark g113, the components of the image signal of the image Ph3 are distributed in a range from an intermediate luminance value to the maximum luminance value. That is, in histograms of an excessively-bright image and an excessively-dark image, the luminance is skewed to the minimum value side or the maximum value side.

In this way, the image signal-evaluating part 22 can evaluate that an image is an excessively-dark image or an excessively-bright image when the luminance component of the image based on the input image signal is skewed to the minimum value side or the maximum value side as the histogram analysis result.

Figure 10:
FIG. 10 is a diagram illustrating an example of an image having an excessively-low contrast.
Figure 11:
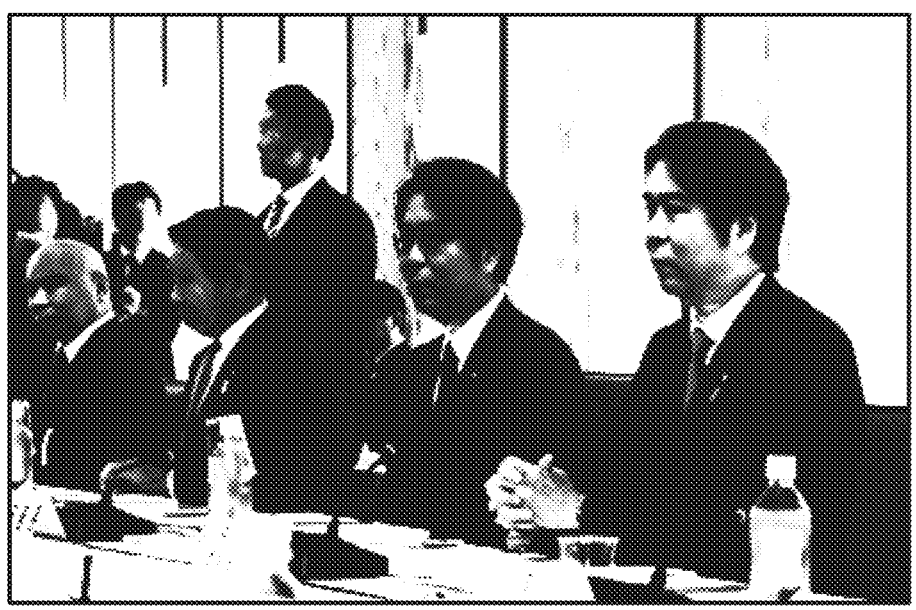
FIG. 11 is a diagram illustrating an example of an image having an excessively-high contrast.

FIG. 10 is a diagram illustrating an example of an image having an excessively-low contrast. FIG. 11 is a diagram illustrating an example of an image having an excessively-high contrast.

The image Ph21 in the example illustrated in FIG. 10 has an excessively-low contrast and the image Ph22 in the example illustrated in FIG. 11 has an excessively-high contrast. Accordingly, when the image Ph21 and the image Ph22 are looked at, it may not be possible to accurately estimate the number of speakers, the positions of the speakers, and whether the speakers are speaking.

Figure 12A:
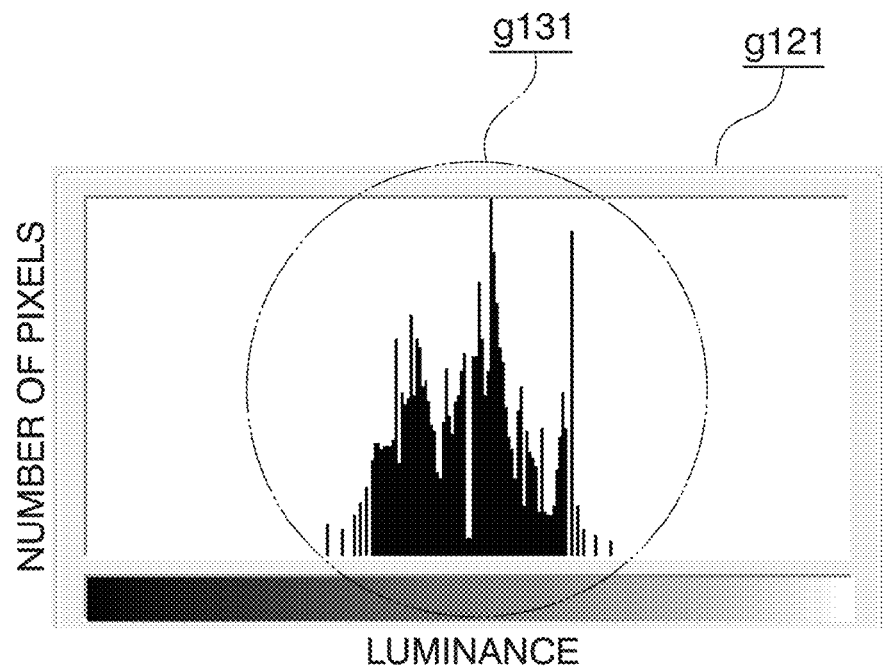
FIG. 12A is a diagram illustrating a histogram of the image illustrated in FIG. 10.
Figure 12B:
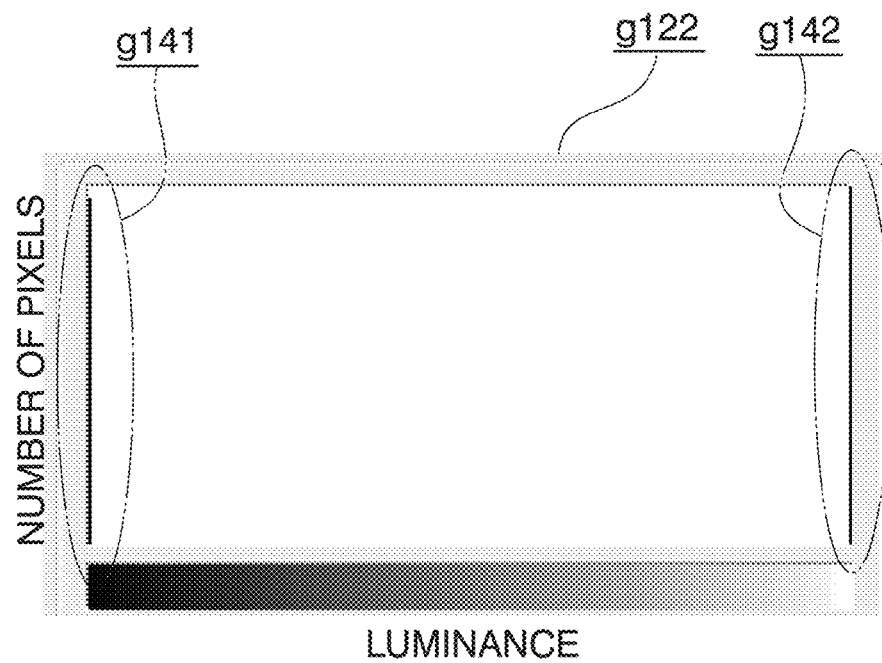
FIG. 12B is a diagram illustrating a histogram of the image illustrated in FIG. 11.

FIG. 12A is a diagram illustrating a histogram of the image illustrated in FIG. 10. FIG. 12B is a diagram illustrating a histogram of the image illustrated in FIG. 11. In FIGS. 12A and 12B, the horizontal axis represents luminance and the vertical axis represents the number of pixels. The luminance has a minimum value on the leftmost side and has a maximum value on the rightmost side.

An image indicated by reference mark g121 in FIG. 12A is a diagram of the histogram of the image Ph21 illustrated in FIG. 10. In the image of the area indicated by reference mark g131, the components of the image signal of the image Ph21 are distributed in the vicinity of the intermediate luminance value and are not distributed in the vicinity of the minimum luminance value and the maximum luminance value.

An image indicated by reference mark g122 in FIG. 12B is a diagram of the histogram of the image Ph22 illustrated in FIG. 11. In the image of the areas indicated by reference marks g141 and g142, the components of the image signal of the image Ph22 are distributed only in the vicinity of the minimum luminance value and the maximum luminance value.

That is, in the histograms of an image having an excessively-low contrast and an image having an excessively-high contrast, the components are distributed only in the vicinity of the intermediate luminance value or distributed only in the vicinity of the minimum luminance value and the maximum luminance value.

In this way, when the components of the image signal are distributed in a range narrower than a predetermined luminance range of the luminance components of the image based on the input image signal as the histogram analysis result, the image signal-evaluating part 22 can evaluate that the image is an image having an excessively-low contrast or an image having an excessively-high contrast.

According to this embodiment, it is possible to quantitatively and simply evaluate the image signal by performing the evaluations as described above.

Figure 13:
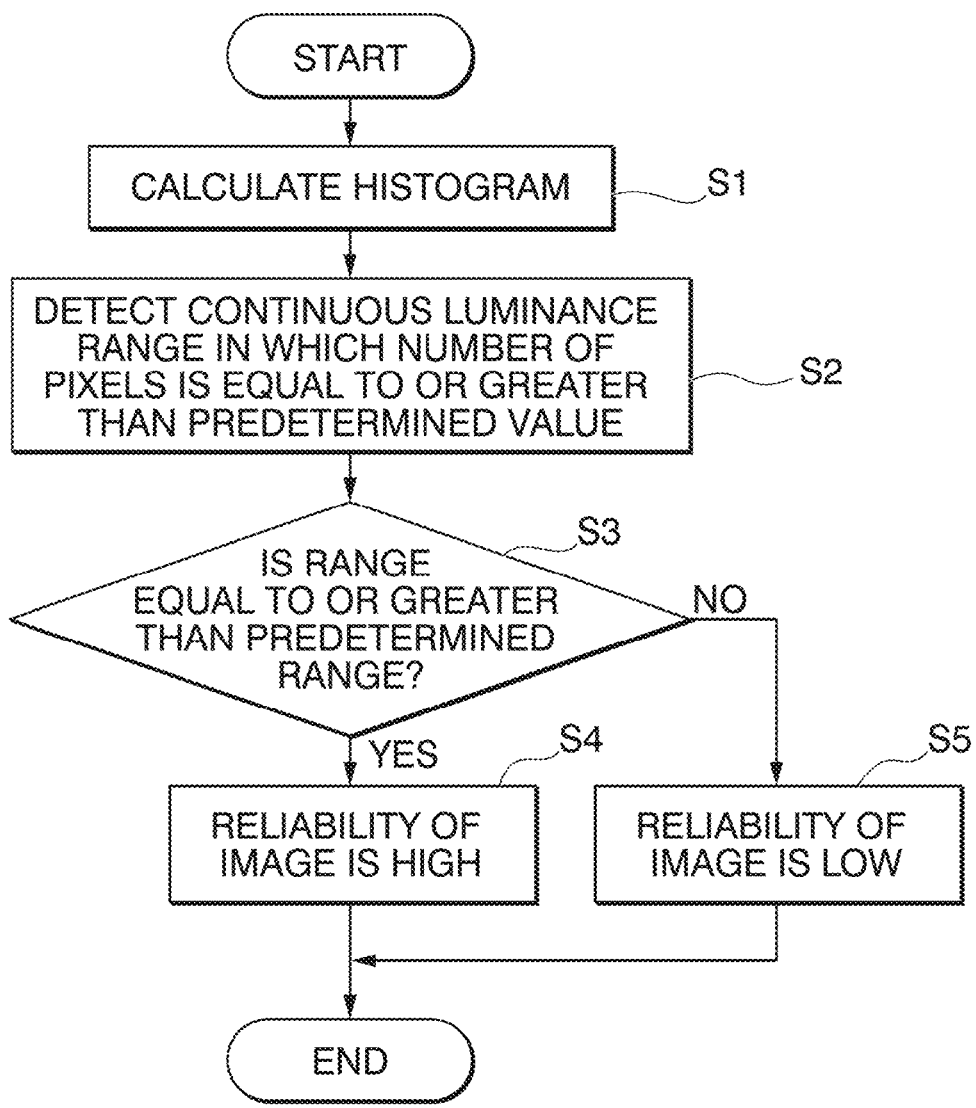
FIG. 13 is a flowchart illustrating a process flow of an image signal-evaluating part according to the first embodiment.

FIG. 13 is a flowchart illustrating a process flow which is performed by the image signal-evaluating part 22 according to this embodiment.

(Step S1) The image signal-evaluating part 22 calculates a histogram which is the number of pixels for each luminance value of the input image signal.

(Step S2) The image signal-evaluating part 22 detects a continuous luminance range in which the number of pixels is equal to or greater than a predetermined value.

(Step S3) The image signal-evaluating part 22 determines whether the calculated range is equal to or greater than a predetermined range. The image signal-evaluating part 22 performs the process of step S4 when it is determined that the calculated range is equal to or greater than the predetermined range (YES in step S3), and performs the process of step S5 when it is determined that the calculated range is not equal to or greater than the predetermined range (NO in step S3).

(Step S4) The image signal-evaluating part 22 determines that the reliability of the image is high, outputs the determination result as information indicating the evaluation result to the reliability-determining part 50, and ends the process flow.

(Step S5) The image signal-evaluating part 22 determines that the reliability of the image is low, outputs the determination result as information indicating the evaluation result to the reliability-determining part 50, and ends the process flow.

In this embodiment, an example in which the reliability of an image is determined based on the luminance and the contrast has been described with reference to FIGS. 7 to 12B, but the reliability of an image may be determined based on at least one of the luminance and the contrast.

The process flow illustrated in FIG. 13 is an example and the present invention is not limited to this example. For example, the image signal-evaluating part 22 may calculate a determination value by counting the luminance value in which the number of pixels is equal to or greater than a predetermined value and dividing the total number of pixels by the counted value (hereinafter, referred to as a count value) after calculating the histogram. For example, when the minimum luminance number is 0 and the maximum luminance number is 255, the count value ranges from 0 to 255. Since the total number of pixels is fixed, the determination value becomes smaller as the count value becomes greater, and the determination value becomes greater as the count value becomes smaller. Specifically, when the total number of pixels in FIG. 2 is 260,000 pixels, the luminance range of the image Ph1 illustrated in FIG. 2 is from 0 to 255, the luminance range of the image Ph2 illustrated in FIG. 7 is from 0 to 111, and the luminance range of the image Ph22 illustrated in FIG. 11 is from 0 to 15 and from 240 to 255. Accordingly, the determination value of the image Ph1 is about 1020, the determination value of the image Ph2 is about 2342, and the determination value of the image Ph22 is about 8667. In this case, the image signal-evaluating part 22 may determine that the reliability of the image is low when the determination value is equal to or greater than a predetermined value, and may determine that the reliability of the image is high when the determination value is less than the predetermined value. The image signal-evaluating part 22 may output the determination result as the information indicating the evaluation result to the reliability-determining part 50. According to this embodiment, it is possible to quantitatively and simply evaluate an image signal by calculating the determination value and performing the evaluation in this way.

Evaluation of Sound Signal

A process flow which is performed by the sound signal-evaluating part 42 will be described below.

Figure 14:
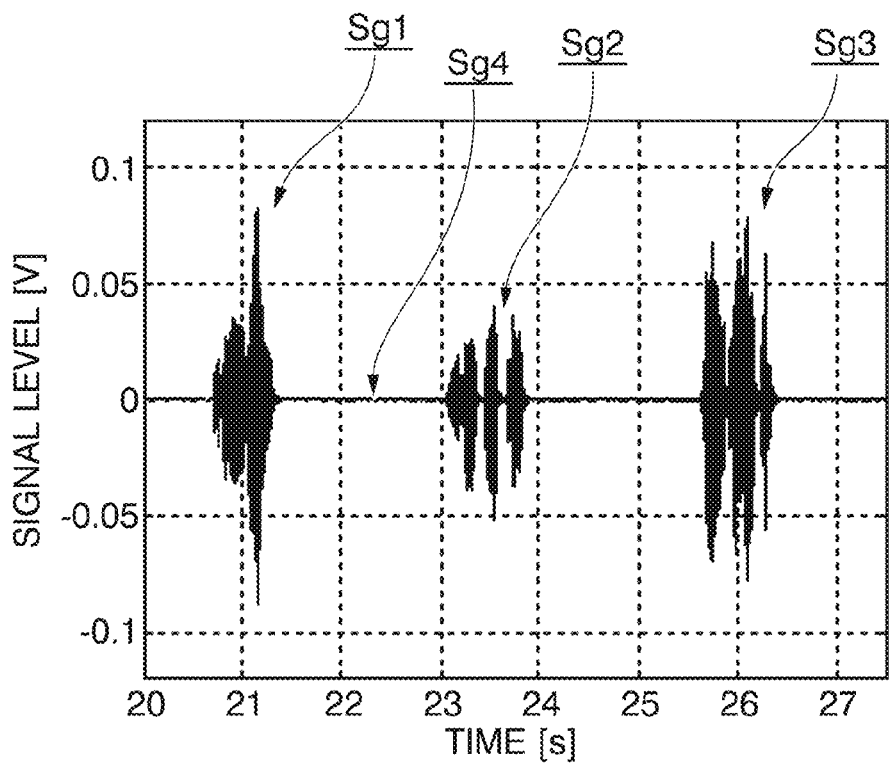
FIG. 14 is a diagram illustrating an example of a sound signal having a low noise level.
Figure 15:
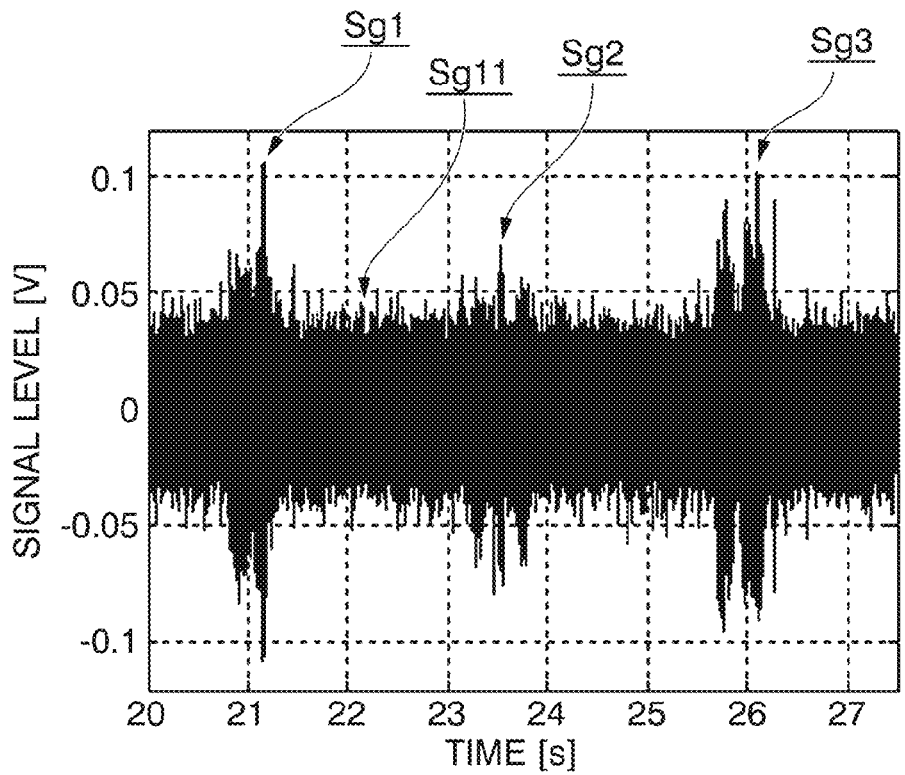
FIG. 15 is a diagram illustrating an example of a sound signal having a high noise level.

FIG. 14 is a diagram illustrating an example of a sound signal having a low noise level. FIG. 15 is a diagram illustrating an example of a sound signal having a high noise level. In FIGS. 14 and 15, the horizontal axis represents time [s] and the vertical axis represents the signal level [V]. The waveforms of the areas indicated by reference marks Sg1 to Sg3 represent the waveforms of the sound signal based on the utterance of the speaker Sp. The waveforms of the areas indicated by reference marks Sg4 and Sg11 represent the waveforms of a noise signal included in the sound signal. The sound signals based on the utterance in FIGS. 14 and 15 have the same timing and the same signal level.

In the example illustrated in FIG. 14, the amplitude of the signal level of the noise signal is equal to or less than 0.01 [Vp-p] in the waveform of the area indicated by reference mark Sg4. The waveform of the area indicated by reference mark Sg1 is observed during a time section of about 20.7 [s] to 21.3 [s]. The waveform of the area indicated by reference mark Sg2 is observed during a time section of about 23.0 [s] to 23.8 [s] and the waveform of the area indicated by reference mark Sg3 is observed during a time section of about 25.5 [s] to 26.3 [s]

On the other hand, in the example illustrated in FIG. 15, the amplitude of the signal level of the noise signal is about 0.1 [Vp-p] in the waveform of the area indicated by reference mark Sg11. Accordingly, the waveforms based on an utterance (Sg1 to Sg3) are observed in only sections greater than ±0.05 [V].

When the sound source localization or the speech recognition is performed using the sound signal illustrated in FIG. 15, the accuracy of sound source direction estimation (sound source localization) is lower and the accuracy of speech recognition is lower in comparison with the case in which the sound source localization or the speech recognition is performed using the sound signal illustrated in FIG. 14.

Accordingly, the sound signal-evaluating part 42 according to this embodiment calculates noise power, for example, using an HRLE technique and evaluates the reliability of the sound signal based on the calculated noise power.

The summary of the HRLE technique will be described below.

The sound signal-evaluating part 42 converts an input sound signal into a complex input spectrum Y(k, l) in a frequency domain. Here, k is an index indicating a frequency and l is an index indicating each frame. Then, the sound signal-evaluating part 42 calculates a power spectrum $|Y(k, l)|^2$ based on the complex input spectrum Y(k, l). |. . .| indicates the absolute value of a complex number ....

Then, the sound signal-evaluating part 42 calculates a power spectrum λ(k, l) of a noise component included in the power spectrum $|Y(k, l)|^2$ using the HRLE technique. The HRLE technique is a method of counting the appearance frequency for each power at a certain frequency to generate a histogram, calculating a cumulative frequency which is obtained by accumulating the frequency counted in the generated histogram with respect to the power, and determining that power giving a predetermined cumulative frequency is the noise power λ(k, l). Accordingly, in the HRLE technique, the estimated noise power becomes greater as the cumulative frequency becomes greater, and the estimated noise power becomes smaller as the cumulative frequency becomes smaller (for example, see Japanese Patent Application No. 2013-013251).

Figure 16:
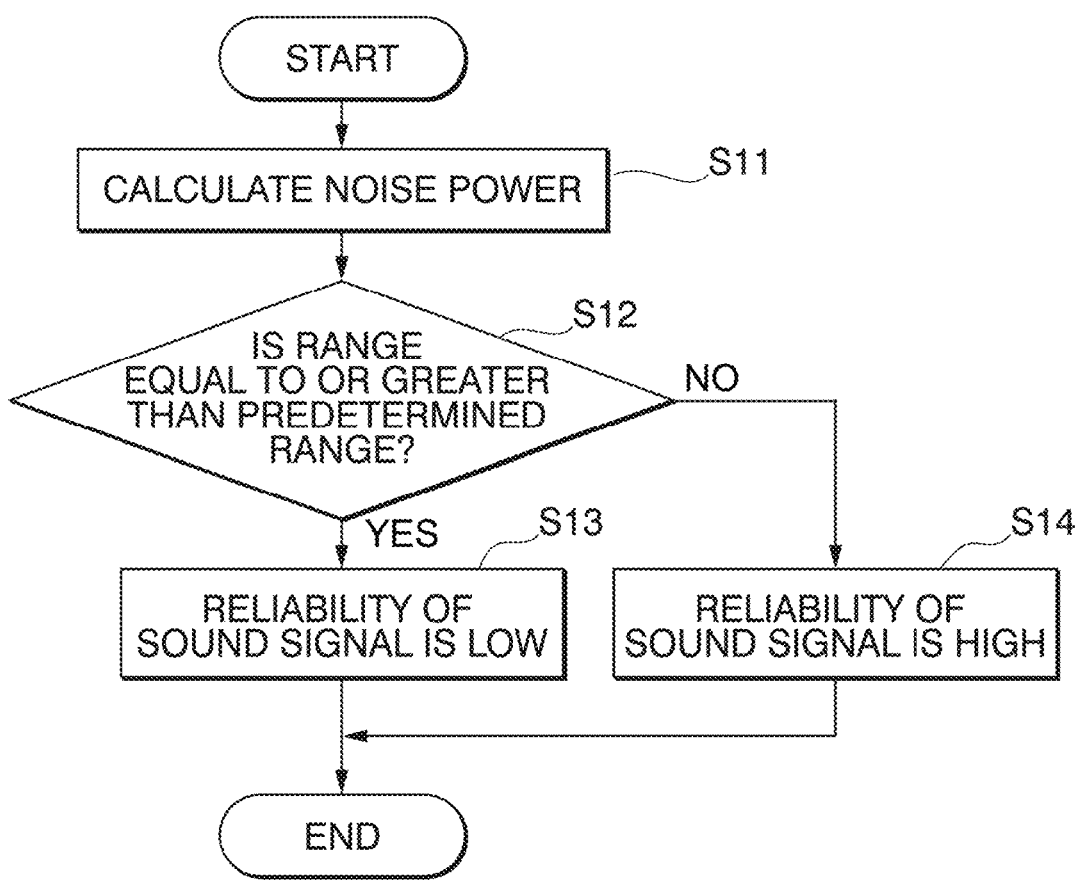
FIG. 16 is a flowchart illustrating a process flow of a sound signal-evaluating part according to the first embodiment.

FIG. 16 is a flowchart illustrating a process flow which is performed by the sound signal-evaluating part 42 according to this embodiment.

(Step S11) The sound signal-evaluating part 42 calculates noise power, for example, using the HRLE technique.

(Step S12) The sound signal-evaluating part 42 determines whether the noise power is equal to or greater than a predetermined value. The sound signal-evaluating part 42 performs the process of step S13 when it is determined that the noise power is equal to or greater than the predetermined value (YES in step S12), and performs the process of step S14 when it is determined that the noise power is not equal to or greater than the predetermined value (NO in step S12).

(Step S13) The sound signal-evaluating part 42 determines that the reliability of the image is low, outputs the determination result as information indicating the evaluation result to the reliability-determining part 50, and ends the process flow.

(Step S14) The sound signal-evaluating part 42 determines that the reliability of the image is high, outputs the determination result as information indicating the evaluation result to the reliability-determining part 50, and ends the process flow.

As described above, in this embodiment, since the reliability of a sound signal is evaluated based on the magnitude of the noise component of the sound signal which is calculated based on the result of the reverberation suppressing process, it is possible to quantitatively and simply evaluate the sound signal.

In the above-mentioned example, the sound signal-evaluating part 42 calculates the noise power, but the noise-suppressing part 46 may calculate the noise power and output a value indicating the calculated noise power to the sound signal-evaluating part 42.

The sound signal-evaluating part 42 may evaluate whether the noise power is large or small by calculating a ratio of the input sound signal and the sound signal after the noise component is suppressed by the noise-suppressing part 46. In this case, the noise-suppressing part 46 outputs the sound signal of which the noise has been suppressed to the sound signal-evaluating part 42.

Process Flow of Sound Source-separating Device

A process flow which is performed by the sound source-separating device 1 will be described below.

Figure 17:
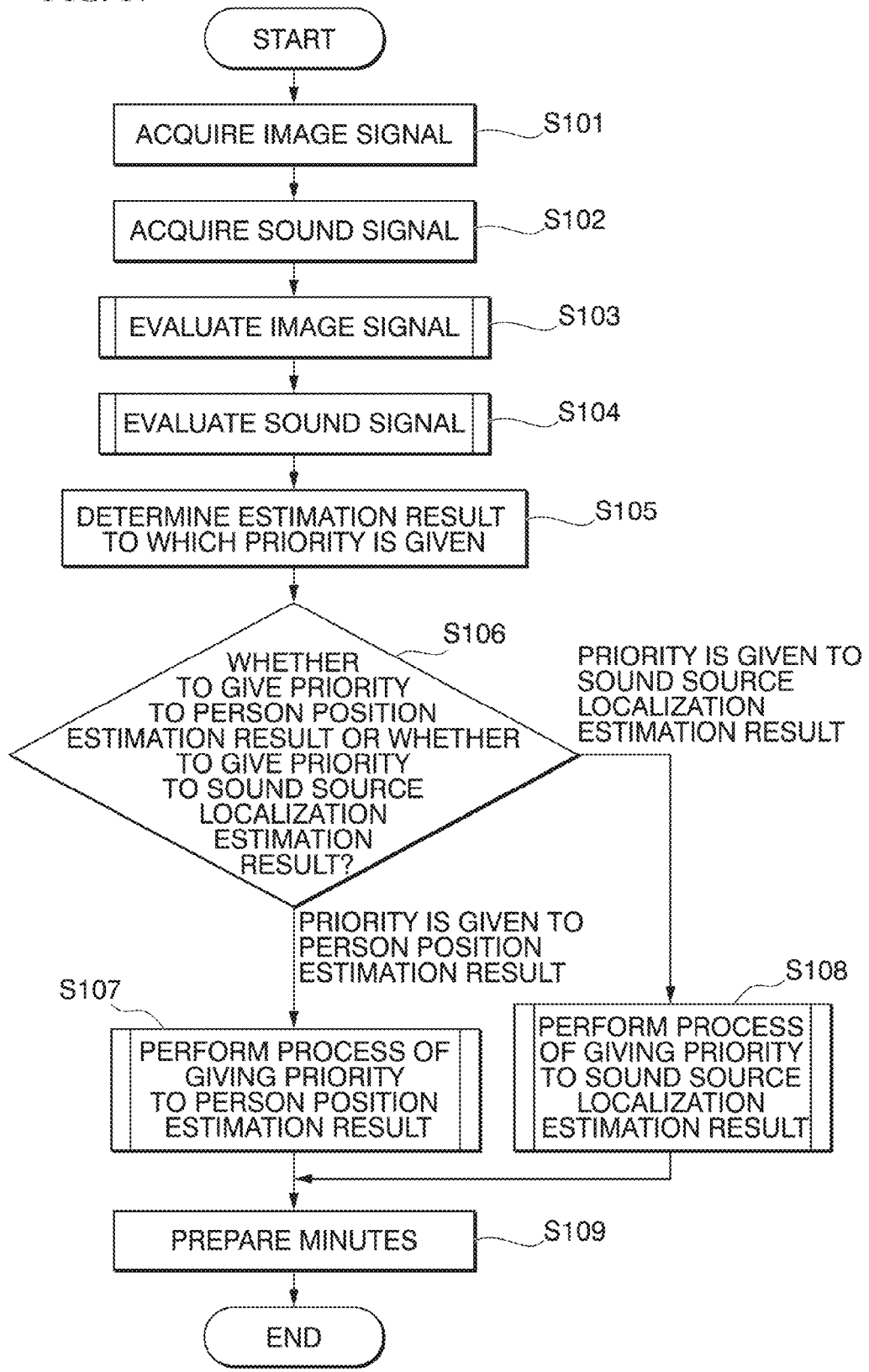
FIG. 17 is a flowchart illustrating an example of a process flow which is performed by the sound source-separating device according to the first embodiment.

FIG. 17 is a flowchart illustrating an example of a process flow which is performed by the sound source-separating device 1 according to this embodiment.

(Step S101) The image signal-acquiring part 21 acquires an image signal generated by the imaging part 10 having captured an image at predetermined intervals. The image signal may be a moving image or a still image.

(Step S102) The sound signal-acquiring part 41 acquires a sound signal generated by the sound-collecting part 30 having collected sound. The process of step S101 and the process of step S102 may be performed in reverse order or may be simultaneously performed.

(Step S103) The image signal-evaluating part 22 performs a process of evaluating an image signal, which has been described above with reference to FIG. 13.

(step S104) The sound signal-evaluating part 42 performs a process of evaluating a sound signal, which has been described above with reference to FIG. 16.

(Step S105) The reliability-determining part 50 determines whether to give priority to the sound source localization estimation result or whether to give priority to the person position estimation result based on the evaluation result input from the image signal-evaluating part 22 and the evaluation result input from the sound signal-evaluating part 42.

(Step S106) The reliability-determining part 50 performs the process of step S107 when priority is given to the person position estimation result (priority is given to the person position estimation result in step S106), and performs the process of step S108 when priority is given to the sound source localization estimation result (priority is given to the sound source localization estimation result in step S 106).

(Step S107) The image signal-processing part 20 and the sound signal-processing part 40 perform the process of giving priority to the person position estimation result and then perform the process of step S 109.

(Step S108) The image signal-processing part 20 and the sound signal-processing part 40 perform the process of giving priority to the sound source direction estimation result and then perform the process of step S 109.

(Step S109) The minutes preparing part 60 performs a minutes preparing process.

Then, the process flow which is performed by the sound source-separating device 1 ends.

Process of Giving Priority to Person Position Estimation Result

The process of giving priority to the person position estimation result will be described below.

Figure 18:
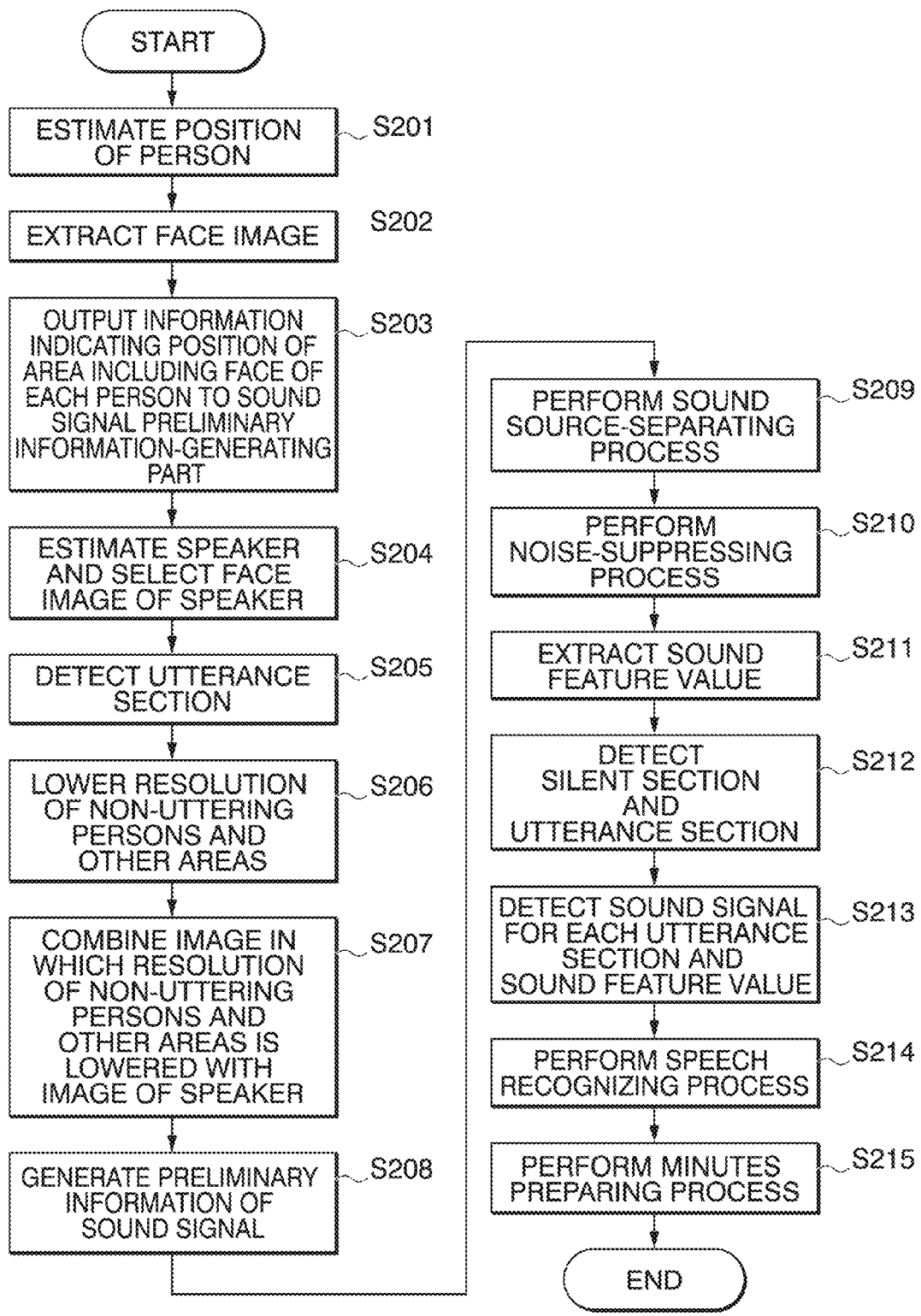
FIG. 18 is a flowchart illustrating a process flow of giving priority to a person position estimation result according to the first embodiment.

FIG. 18 is a flowchart illustrating a process flow of giving priority to the person position estimation result according to this embodiment.

(Step S201) When the determination result indicating that priority is given to the person position estimation result is input from the reliability-determining part 50, the person position-estimating part 24 estimates an image position of an area including faces of persons appearing in an image based on the image signal input from the image signal-acquiring part 21 using a well-known image recognition technique.

(Step S202) The person position-estimating part 24 extracts the image of the area (face image) including a face of each person from the image signal (overall image) input from the image signal-acquiring part 21 based on the estimation result.

(Step S203) The person position-estimating part 24 outputs information indicating the estimated position of the area including a face of each person which is expressed in the world coordinate system to the sound signal preliminary information-generating part 43.

(Step S204) The lip-detecting part 25 estimates an uttering speaker by detecting a shape of a speaker's lip based on the face image information input from the person position-estimating part 24 using a well-known technique (for example, see Japanese Unexamined Patent Application, First Publication No. 2011-191423). Then, the lip-detecting part 25 selects the face image information of the uttering speaker based on the detection result.

(Step S205) The utterance section-detecting part 26 detects an utterance section based on the detection result from the lip-detecting part 25 using a well-known technique (for example, see Japanese Unexamined Patent Application, First Publication No. 2011-191423).

(Step S206) The image-processing part 27 lowers the resolution of the image of non-uttering persons and other areas during the utterance section to be lower than that of the input image using the input information.

(Step S207) The image-processing part 27 combines the image of non-uttering persons and other areas in which the resolution is lowered with the face image of a speaker in which the resolution is not changed.

(Step S208) When the determination result indicating that priority is given to the person position estimation result is input from the reliability-determining part 50, the sound signal preliminary information-generating part 43 generates preliminary information of sound signals using the information indicating the position of the area including a face of the uttering person for each utterance section.

(Step S209) The sound source-separating part 45 separates a sound source based on the preliminary information of sound signals from the sound signal preliminary information-generating part 43 and the sound signals input using a well-known technique.

(Step S210) The noise-suppressing part 46 suppresses a noise component included in the sound signals based on the separation result input from the sound source-separating part 45 using a well-known technique.

(Step S211) The sound feature value-extracting part 47 extracts, for example, an MSLS which is a sound feature value from the reverberation-suppressed sound signal for each sound source input from the noise-suppressing part 46.

(Step S212) The utterance section-detecting part 48 detects a section between utterances, that is, a silent section, based on the feature value input from the sound feature value-extracting part 47. Then, the utterance section-detecting part 48 detects an utterance section using the detected silent section.

(Step S213) The sound-processing part 49 extracts the sound signal (subjected to the sound source-separating process and the noise-suppressing process) generated in an utterance section and the sound feature value corresponding to speech for each utterance section.

(Step S214) The utterance recognizing part 61 recognizes an utterance using the input information indicating an utterance section and the input sound feature value.

(Step S215) The correlation part 62 correlates the utterance content with the image during an utterance to generate minutes information. Then, the correlation part 62 stores the generated minutes information in the storage part 63.

Then, the process of giving priority to the person position estimation result ends.

Process of Giving Priority to Sound Source Localization Estimation Result

The process of giving priority to the sound source localization estimation result will be described below.

Figure 19:
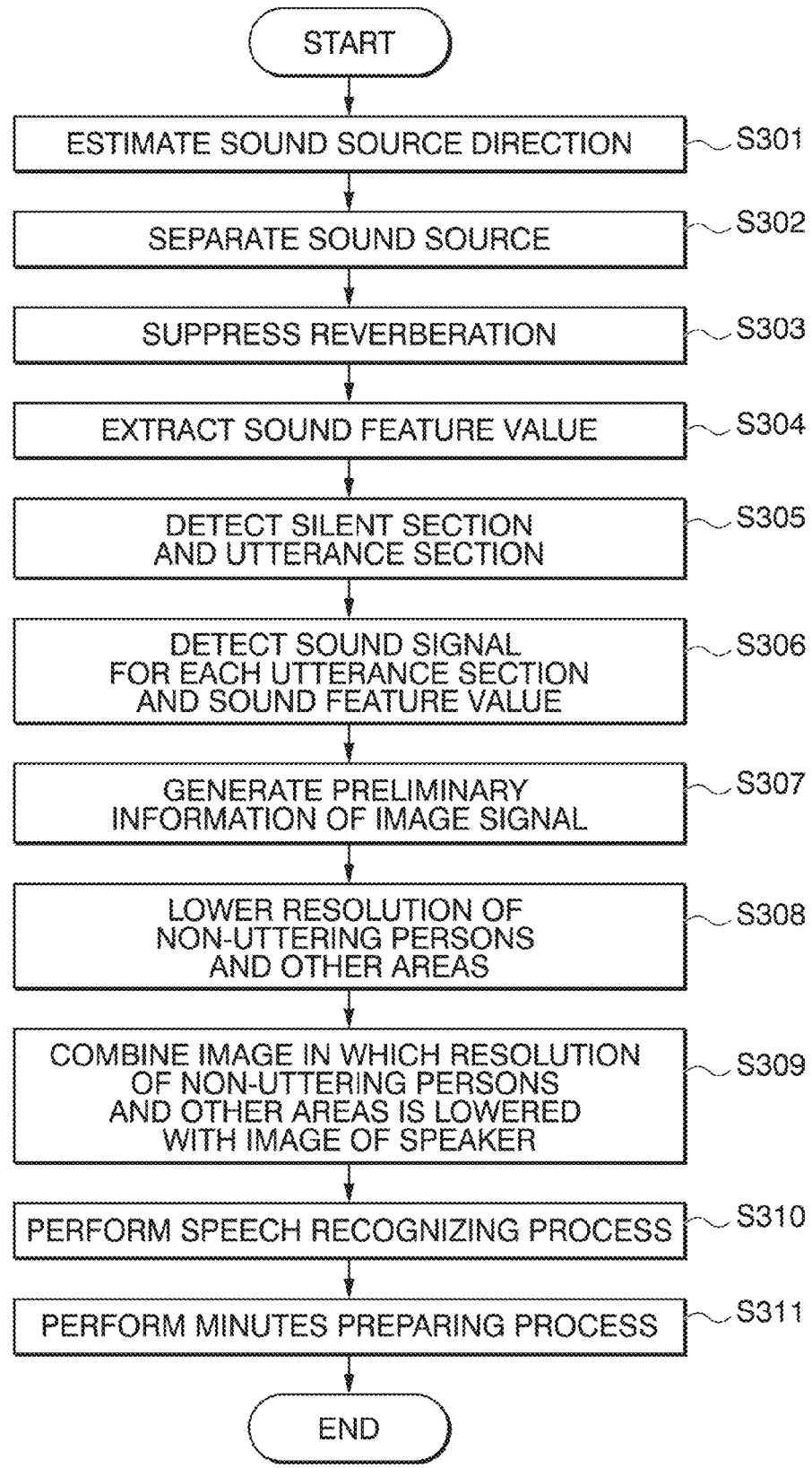
FIG. 19 is a flowchart illustrating a process flow of giving priority to a sound source localization estimation result according to the first embodiment.

FIG. 19 is a flowchart illustrating a process flow of giving priority to the sound source localization estimation result according to this embodiment.

(Step S301) When the determination result indicating that priority is given to the sound source localization estimation result is input from the reliability-determining part 50, the sound source direction-estimating part 44 estimates a direction of each sound source based on the input sound signal, for example, using a MUSIC method or a beam forming method. A speaker is specified based on the sound source direction estimation result by the sound source direction-estimating part 44.

(Step S302) The sound source-separating part 45 separates sound sources based on the estimation result and the sound signals input from the sound source direction-estimating part 44 using a well-known technique such as a blind signal separation technique, a blind sound source separation technique based on independent component analysis, or a blind signal separation technique using sparsity of a signal.

(Step S303) The noise-suppressing part 46 suppresses noise components included in the sound signals based on the separation result input from the sound source-separating part 45 using a well-known technique such as an HRLE technique, a technique based on a process of inversely filtering a room impulse response, a technique based on power spectrum estimation of a sound source, a technique based on a modulation transfer function (MTF) theory, and a technique based on geometric sound separation (GSS).

(Step S304) The sound feature value-extracting part 47 extracts, for example, an MSLS which is a sound feature value from the reverberation-suppressed speech signal for each sound source input from the noise-suppressing part 46.

(Step S305) The utterance section-detecting part 48 extracts a silent section and an utterance section based on the sound feature value input from the sound feature value-extracting part 47.

(Step S306) The sound-processing part 49 extracts the sound signal (subjected to the sound source-separating process and the noise-suppressing process) generated during the utterance section and the sound feature value corresponding to the speech for each utterance section.

(Step S307) The image signal preliminary information-generating part 23 performs the image signal preliminary information generating process for each utterance section using the sound source direction estimation result and outputs the information, which is the generated preliminary information of the image signal, indicating an area of a face of a speaker to the image-processing part 27.

(Step S308) The image-processing part 27 lowers the resolution of the image of non-uttering persons and other areas during the utterance section to be lower than that of the input image using the input information.

(Step S309) The image-processing part 27 combines the image of non-uttering persons and other areas in which the resolution is lowered with the face image of a speaker in which the resolution is not changed.

(Step S310) The utterance recognizing part 61 recognizes an utterance using the input information indicating an utterance section and the input sound feature value.

(Step S311) The correlation part 62 correlates the utterance content with the image during an utterance to generate minutes information. Then, the correlation part 62 stores the generated minutes information in the storage part 63.

Then, the process of giving priority to the sound source localization estimation result ends.

As described above, the sound source-separating device (for example, the sound source-separating device 1) according to this embodiment includes: a sound-collecting part (for example, the sound-collecting part 30) configured to collect sound and generate a sound signal; an imaging part (for example, the imaging part 10) configured to capture an image and generate an image signal; a sound signal-evaluating part (for example, the sound signal-evaluating part 42) configured to evaluate the sound signal; an image signal-evaluating part (for example, the image signal-evaluating part 22) configured to evaluate the image signal; a selection part (for example, the reliability-determining part 50) configured to select whether to estimate a sound source direction based on the sound signal or whether to estimate a sound source direction based on the image signal, based on an evaluation result of the sound signal by the sound signal-evaluating part and an evaluation result of the image signal by the image signal-evaluating part; a person position-estimating part configured to estimate information indicating a direction of a speaker from the image using information indicating the sound source direction estimated based on the captured image; a sound source direction-estimating part (for example, the sound source direction-estimating part 44) configured to estimate a sound source direction based on the sound signal using the information indicating the sound source direction estimated based on the sound signal; and a sound source-separating part (for example, the sound source direction-estimating part 44) configured to extract a sound signal corresponding to the sound source direction from the sound signal based on the estimated sound source direction.

According to this configuration, the sound source-separating device 1 can estimate a sound source direction based on at least one of the evaluation result of the image signal and the evaluation result of the sound signal. Accordingly, according to this embodiment, it is possible to estimate the sound source direction using the sound signal when the reliability of the image signal is low and to estimate the sound source direction based on the image signal when the reliability of the sound signal is low. According to this embodiment, it is possible to separate an uttered speech signal based on the estimation result. In this way, according to this embodiment, it is possible to separate sound sources by mutually complementing the sound signal and the image signal.

In the sound source-separating device (the sound source-separating device 1) according to this embodiment, the sound source-separating part (for example, the sound source-separating part 45 and the sound-processing part 49) estimates the sound source direction using the sound signal or estimates the sound source direction based on the information indicating the direction of a speaker estimated by the person position-estimating part (for example, the person position-estimating part 24), extracts a sound signal by separating the sound signal for each sound source using the sound source direction estimation result, and includes a feature value-calculating part (for example, the sound feature value-extracting part 47) configured to calculate a feature value of the sound signal for each sound source separated by the sound source-separating part and a speech-recognizing part (for example, the utterance recognizing part 61) configured to recognize utterance content based on the feature value of the sound signal and to convert the recognized utterance content into text information.

According to this configuration, the sound source-separating device 1 according to this embodiment can perform speech recognition on the sound signal separated based on the sound source direction estimation result using at least one of the image signal and the sound signal and convert the recognized speech into text information. As a result, according to this configuration, even when the reliability of any one of the image signal and the sound signal is low, it is possible to enhance the accuracy of a text recognition rate in the minutes.

In this embodiment, the image signal-evaluating part 22 evaluates the image signal and the sound signal-evaluating part 42 evaluates the sound signal, but the reliability-determining part 50 may evaluate the image signal and the sound signal.

In this case, the imaging part 10 or the image signal-processing part 20 outputs the captured image to the reliability-determining part 50. The sound-collecting part 30 or the sound signal-processing part 40 outputs the generated sound signal to the reliability-determining part 50.

In this embodiment, the number of speakers is assumed to be one as illustrated in FIG. 4, but the present invention is not limited to this example. Two or more speakers who simultaneously speak may be present. For example, when the speaker Sp2 and the speaker Sp4 in FIG. 4 simultaneously speak, the sound source-separating device 1 does not change the resolution of the image of the area including the faces of the speaker Sp2 and the speaker Sp4.

In this embodiment, the resolution of the image of the area including the face of the speaker Sp is not changed, but the present invention is not limited to this example. When the resolution of the captured image is sufficiently high (for example, 600 [bpi]), the resolution may be changed to a resolution at which speakers can be distinguished and an utterance can be understood.

In this embodiment, the imaging part 10 includes a single camera, but the imaging part 10 may include two or more cameras. For example, when participants are seated at right and left tables, the cameras may be installed at the right and left tables, respectively. In this case, the constituent parts of the image signal-processing part 20 perform the above-mentioned processes on two or more image signals. The image-processing part 27 may output the two or more images generated in this way (for example, the image captured by the left camera and the image captured by the right camera) to the minutes preparing part 60 without any processing or may combine the two or more images based on the arrangement of the cameras.

When the number of participants in a conference is two or more and it is difficult to image all the participants using the imaging part 10, for example, at least an overall image can be merely an image including a speaker. In this case, the sound source-separating device 1 may define a speaker and may capture an image of the speaker in a state in which the imaging part 10 faces the direction of the defined speaker.

That is, the sound source-separating device 1 may control the imaging direction of the imaging part 10 based on the sound source direction estimation result or the person position estimation result.

When the number of participants is two or more, the sound source-separating device 1 may control an angle of view of the imaging part 10 to an angle of view including the speaker and the neighboring persons thereof based on the sound source direction estimation result and the person position estimation result.

Second Embodiment

Figure 20:
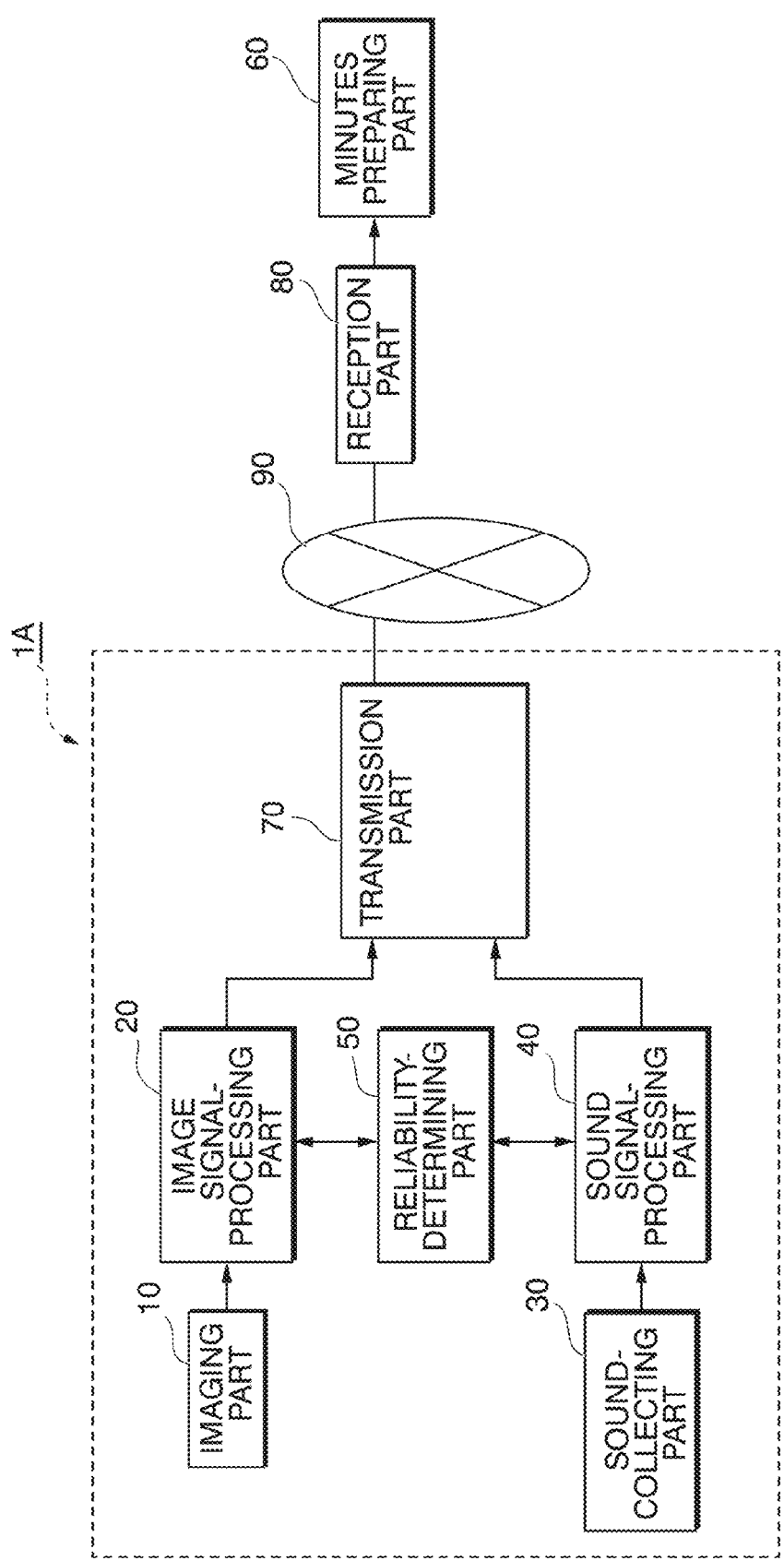
FIG. 20 is a block diagram illustrating a configuration of a sound source-separating device according to a second embodiment.

FIG. 20 is a block diagram illustrating a configuration of a sound source-separating device 1A according to a second embodiment. As illustrated in FIG. 20, the sound source-separating device 1A includes an imaging part 10, an image signal-processing part 20, a sound-collecting part 30, a sound signal-processing part 40, a reliability-determining part 50 (the selection part), and a transmission part 70. The sound source-separating device 1A is connected to a reception part 80 via a network 90. The network 90 may be a wired network or a wireless network. The reception part 80 is connected to a minutes preparing part 60. The functional parts having the same functions as in the sound source-separating device 1 (FIG. 1) according to the first embodiment will be referenced by the same reference marks and description thereof will not be repeated.

Image information subjected to the image processing and illustrated in FIG. 4 from the image signal-processing part 20 is input to the transmission part 70. Detected utterance section information from the sound signal-processing part 40 and MSLS information of a sound feature value corresponding to a sound signal during the utterance section are input to the transmission part 70. The transmission part 70 transmits the input information to the reception part 80 via the network 90.

The reception part 80 receives information from the transmission part 70 via the network 90 and outputs the received information to the minutes preparing part 60.

When a variety of information is transmitted from the sound source-separating device 1A to the minutes preparing part 60 and an image captured by the imaging part 10 is transmitted without any change, the capacity of the transmission data is great. Accordingly, since the load of the network 90 increases and the amount of image information which is recorded and the amount of prepared minutes increase, the file volume of the minutes increases. Here, when only the image information of an area including a face of a speaker is transmitted from the sound source-separating device 1A to the minutes preparing part 60, the file capacity decreases but a participant other than the speaker does not appear in the image, which makes it difficult to understand a situation of the conference. A reader of the minutes cannot determine to whom the speaker is speaking from the image.

On the other hand, as in this embodiment, by combining an image in which the resolution of an area including a face of a speaker is not changed with an image in which the resolution of an image of persons other than the speaker and other areas is lowered and transmitting the combined image to the minutes preparing part 60 in correlation with speech data, it is possible to reduce the file capacity and to provide an image from which a situation of the conference can be understood.

As described above, the sound source-separating device (the sound source-separating device 1A) according to this embodiment includes a transmission part (for example, the transmission part 70) configured to transmit information in which the image of the area extracted from the image signal and including the face of the speaker is correlated with the extracted sound signal for each utterance section.

According to this configuration, in the sound source-separating device 1A according to this embodiment, the sound signal separated based on the sound source direction estimation result using at least one of the image signal and the sound signal and the extracted image including the face of the speaker can be transmitted to another device in correlation with each other for each utterance section. As a result, when the sound source-separating device having this configuration is used for a video teleconference and the reliability of any one of the image signal and the sound signal is low, it is possible to transmit the separated sound signal and the extracted image including the face of the speaker to another device in correlation with each other.

By installing the sound source-separating device 1A according to the second embodiment in each conference room, it is possible to hold a video teleconference using a network. In this case, it is possible to reduce the amount of data to be transmitted as described above.

In this embodiment, the sound source-separating device 1A may include a reception part 80 and a minutes preparing part 60.

In the first embodiment and the second embodiment, the resolution of the image of persons other than the speaker and other areas is lowered, but the present invention is not limited to this example. In an image, only the image of a speaker Sp may be set to a color image and the image of persons other than the speaker and other areas may be set to a binarized image of gray scale or black and white. Image processing using an image filter (for example, a Gaussian filter) for fading the image of persons other than a speaker and other areas may be performed. In this case, a viewer of the minutes can understand a situation of a conference and a speaker from the image.

In the first embodiment and the second embodiment, the sound source-separating device (1 or 1A) is installed in a conference room, but the present invention is not limited to this example. For example, the imaging part 10 and the sound-collecting part 30 may be installed in a conference room, and the image signal-processing part 20, the sound signal-processing part 40, the reliability-determining part 50, and the minutes preparing part 60 may be installed in a place other than the conference room.

The sound source-separating device (1 or 1A) may be included, for example, in a minutes preparing device, a humanoid robot, a portable terminal (such as a smart phone, a tablet PC, and a portable game machine), or a personal computer (PC).

In the first embodiment and the second embodiment, an image during an utterance is correlated with minutes information, but the present invention is not limited to this example. For example, only an image including an area of a face of a speaker may be correlated with the minutes information.

The configuration of the sound source-separating device (1 or 1A) described in the first embodiment or the second embodiment is only an example, and the sound source-separating device (1 or 1A) may include only functional parts necessary for usage among all the functional parts or may include another functional part.

The processes on an image signal or the processes on a sound signal may be performed by recording a program for realizing the functions of the sound source-separating device (1 or 1A) according to the present invention on a computer-readable recording medium and causing a computer system to read and execute the program recorded on the recording medium. Here, the "computer system" includes an OS or hardware such as peripherals. The "computer system" may include a homepage providing environment (or display environment) when a WWW system is used. Examples of the "computer-readable recording medium" include a portable medium such as a flexible disk, a magneto-optical disc, a ROM, and a CD-ROM and a storage device such as a hard disk built in a computer. The "computer-readable recording medium" may include a medium that holds a program for a predetermined time, like a volatile memory (RAM) in a computer system serving as a server or a client when a program is transmitted via a network such as the Internet or a communication circuit such as a telephone circuit.

The program may be transmitted from a computer system storing the program in a storage device or the like to another computer system via a transmission medium or by transmission waves in the transmission medium. Here, the "transmission medium" via which the program is transmitted denotes a medium having a function of transmitting information such as a network (communication network) such as the Internet or a communication circuit (communication line) such as a telephone line. The program may be configured to realize a part of the above-mentioned functions. The program may be a program, that is, a so-called differential file (differential program), capable of realizing the above-mentioned functions by combination with a program recorded in advance in a computer system.

What is claimed is:

1. A sound source-separating device comprising:
    a sound-collecting part configured to collect sound and generate a first sound signal;
    an imaging part configured to capture an image and generate a first image signal;
    a sound signal-evaluating part configured to evaluate the first sound signal;
    an image signal-evaluating part configured to evaluate the first image signal;
    a selection part configured to select whether to estimate a sound source direction based on the first sound signal or whether to estimate a sound source direction based on the first image signal, based on an evaluation result of the first sound signal by the sound signal-evaluating part and an evaluation result of the first image signal by the image signal-evaluating part;
    a person position-estimating part configured to estimate a sound source direction indicating a direction of a speaker by using the first image signal when the selection part has selected that the sound source direction is estimated based on the first image signal;
    a sound source direction-estimating part configured to estimate a sound source direction by using the first sound signal when the selection part has selected that the sound source direction is estimated based on the first sound signal;
    a sound source-separating part configured to extract a second sound signal corresponding to the sound source direction from the first sound signal based on the estimated sound source direction estimated by the sound source direction-estimating part when the selection part has selected that sound source direction is estimated based on the first sound signal;
    an image-extracting part configured to extract a second image signal of an area corresponding to the estimated sound source direction from the first image signal, the estimated sound source direction being estimated by the person position-estimating part when the selection part has selected that sound source direction is estimated based on the first image signal; and
    an image-combining part configured to change a third image signal of an area other than the area for the second image signal and to combine the third image signal with the second image signal.

2. The sound source-separating device according to claim 1, wherein the image-combining part changes a resolution of the third image signal to be lower than a resolution of the second image signal.

3. The sound source-separating device according to claim 1, wherein the image signal-evaluating part calculates a histogram of the first image signal, calculates a luminance range of luminance in which the number of pixels is equal to or greater than a predetermined value in the histogram, evaluates that reliability of the first image signal is high when the luminance range is equal to or greater than a predetermined range, and evaluates that the reliability of the first image signal is low when the luminance range is less than the predetermined range.

4. The sound source-separating device according to claim 1, wherein the image signal-evaluating part calculates a histogram of the first image signal, counts a luminance number in which the number of pixels is equal to or greater than a predetermined value, calculates a determination value by dividing total number of pixels of the first image signal by the counted value, and evaluates reliability of the first image signal based on the determination value.

5. The sound source-separating device according to claim 1, wherein the sound signal-evaluating part calculates a magnitude of a noise component of the first sound signal based on a result of a noise-suppressing process which has been performed on the first sound signal and evaluates reliability of the first sound signal based on the calculated magnitude of the noise component.

6. The sound source-separating device according to claim 1, further comprising:
    an utterance section-detecting part configured to detect an utterance section based on at least one of the first sound signal and the first image signal;
    a sound-processing part configured to extract a third sound signal, which corresponds to the estimated sound source direction, from the first sound signal for each utterance section; and
    a correlation part configured to correlate the third sound signal with a fourth image signal of an area, which is extracted from the first image signal, including a face of a speaker for each utterance section.

7. The sound source-separating device according to claim 6, further comprising a transmission part configured to transmit information in which the fourth image signal and the third sound signal are correlated with each other.

8. The sound source-separating device according to claim 1, wherein the sound-processing part estimates a sound source direction by using the first sound signal or estimates a sound source direction based on information indicating the direction of a speaker which is estimated by the person position-estimating part and extracts a fourth sound signal by separating the first sound signal for each sound source by using the sound source direction estimation result,
wherein the sound-processing part includes:
a feature value-calculating part configured to calculate a feature value of the fourth sound signal for each sound source separated by the sound-processing part; and
a speech-recognizing part configured to recognize utterance content based on the feature value of the fourth sound signal and convert the recognized utterance content into text information.

9. A sound source-separating method comprising:
collecting sound and generating a first sound signal;
capturing an image and generating a first image signal;
evaluating the first sound signal;
evaluating the first image signal;
selecting whether to estimate a sound source direction based on the first sound signal or whether to estimate a sound source direction based on the first image signal, based on an evaluation result of the first sound signal in the evaluating of the first sound signal and an evaluation result of the first image signal in the evaluating of the first image signal;
estimating a sound source direction indicating a direction of a speaker by using the first image signal when it has been selected that a sound source direction is estimated based on the first image signal;
estimating a sound source direction by using the first sound signal when it has been selected that a sound source direction is estimated based on the first sound signal;
extracting a second sound signal corresponding to the sound source direction from the first sound signal based on the sound source direction estimated by using the first sound signal when the selection part has selected that sound source direction is estimated based on the first sound signal;
extracting a second image signal of an area corresponding to the estimated sound source direction from the first image signal, the estimated sound source direction being estimated by using the first image signal when the selection part has selected that sound source direction is estimated based on the first image signal; and
changing a third image signal of an area other than the area for the second image signal and combining the third image signal with the second image signal.

* * * * *